United States Patent
Kim et al.

(10) Patent No.: US 9,276,433 B2
(45) Date of Patent: Mar. 1, 2016

(54) ROBOT CLEANING SYSTEM AND CONTROL METHOD HAVING A WIRELESS ELECTRIC POWER CHARGE FUNCTION

(75) Inventors: Nam Yun Kim, Seoul (KR); Eun Seok Park, Suwon-si (KR); Sang Wook Kwon, Seongnam-si (KR); Young Tack Hong, Seongnam-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 13/080,844

(22) Filed: Apr. 6, 2011

(65) Prior Publication Data

US 2011/0241616 A1 Oct. 6, 2011

(30) Foreign Application Priority Data

Apr. 6, 2010 (KR) .................. 10-2010-0031295

(51) Int. Cl.
*H02J 7/02* (2006.01)
*H04B 5/00* (2006.01)

(52) U.S. Cl.
CPC .............. *H02J 7/025* (2013.01); *H04B 5/0037* (2013.01); *H04B 5/0081* (2013.01)

(58) Field of Classification Search
CPC ........................................................ H02J 7/025
USPC .................................................. 320/108, 109
See application file for complete search history.

(56) References Cited

U.S. PATENT DOCUMENTS

| | | | |
|---|---|---|---|
| 5,109,566 A * | 5/1992 | Kobayashi et al. ............. 15/319 |
| 6,157,162 A * | 12/2000 | Hayashi et al. ............... 320/104 |
| 6,764,373 B1 * | 7/2004 | Osawa et al. ................. 446/175 |
| 7,151,357 B2 * | 12/2006 | Xian et al. .................... 320/108 |
| 7,332,890 B2 | 2/2008 | Cohen et al. | |
| 7,489,277 B2 * | 2/2009 | Sung et al. ..................... 343/702 |
| 8,224,487 B2 * | 7/2012 | Yoo et al. ....................... 700/259 |
| 2004/0025268 A1 * | 2/2004 | Porat et al. ...................... 15/1.7 |
| 2006/0200282 A1 * | 9/2006 | Lee et al. ........................ 701/23 |
| 2007/0021867 A1 * | 1/2007 | Woo .............................. 700/245 |
| 2009/0102296 A1 * | 4/2009 | Greene et al. ................. 307/149 |
| 2009/0212735 A1 * | 8/2009 | Kung et al. .................... 320/101 |
| 2009/0289595 A1 | 11/2009 | Chen et al. | |
| 2010/0082193 A1 * | 4/2010 | Chiappetta ...................... 701/24 |
| 2011/0084656 A1 * | 4/2011 | Gao ............................... 320/108 |
| 2011/0282527 A1 * | 11/2011 | Inbarajan et al. ............... 701/22 |

(Continued)

FOREIGN PATENT DOCUMENTS

| | | |
|---|---|---|
| JP | 2003-143780 A | 5/2003 |
| JP | 2009-213294 | 9/2009 |

(Continued)

OTHER PUBLICATIONS

Office Action issued by the Korean Patent Office on Nov. 20, 2015, for the corresponding Korean Patent Application No. 10-2010-0031295, 9 pages in English, 8 pages in Korea.

*Primary Examiner* — Drew A Dunn
*Assistant Examiner* — Jerry D Robbins
(74) *Attorney, Agent, or Firm* — NSIP Law

(57) ABSTRACT

Provided is a wirelessly charged robot cleaning system and a method for wirelessly charging a robot cleaner. The wirelessly charged robot may include a target resonator to receive a resonance power through energy-coupling with a source resonator of a wireless power transmitter, a wireless power receiving unit to convert the received resonance power into a rated voltage, and a battery controller to check the remaining capacity of the battery based and to charge the battery.

25 Claims, 19 Drawing Sheets

(56) References Cited

FOREIGN PATENT DOCUMENTS

| | | |
|---|---|---|
| JP | 2009-246451 | 10/2009 |
| KR | 10-2004-0088243 | 10/2004 |
| KR | 10-2007-0119132 | 12/2007 |
| KR | 10-2009-0007906 | 1/2009 |
| KR | 10-2009-0025876 | 3/2009 |

* cited by examiner

ROBOT CLEANING SYSTEM AND CONTROL METHOD HAVING A WIRELESS ELECTRIC POWER CHARGE FUNCTION

CROSS-REFERENCE TO RELATED APPLICATION(S)

This application claims the benefit under 35 U.S.C. §119(a) of Korean Patent Application No. 10-2010-0031295, filed on Apr. 6, 2010, in the Korean Intellectual Property Office, the entire disclosure of which is incorporated herein by reference for all purposes.

BACKGROUND

1. Field

The following description relates to a robot cleaning system, and more particularly, to a robot cleaning system that may check the battery of a robot cleaner in real time and may wirelessly charge the battery.

2. Description of Related Art

A robot cleaner is a device that may be used to remove dust and other impurities to clean a room. Generally, a vacuum that sucks in dust uses a suction force of a low pressure unit. Recently, a robot cleaner that automatically moves using an auto-driving feature while cleaning without a control of a user, has been developed.

Generally, in a robot cleaning system, a robot cleaner is used together with a station that is located in a predetermined location. The station is used to charge the robot cleaner and to remove dust stored inside the robot cleaner. The station may also be referred to as a docking station.

In the robot cleaning system, the robot cleaner is connected to the docking station to charge the battery. In this example, the docking needs to be accurately performed, and when the docking is inaccurately performed, charging may not be successfully performed.

That is, conventional robot cleaners must be directly connected to a device, such as the docking station, to charge their batteries, or perform operations to change their batteries.

SUMMARY

In one general aspect, there is provided a robot cleaning system, the system comprising a wireless power transmitter to generate power using a provided power supply and to wirelessly transmit the generated power, and a robot cleaner to operate in a cleaning mode based on a scope of a predetermined area to be cleaned, to receive and convert the wirelessly transmitted power into a rated voltage, and to charge a battery using the rated voltage.

The wireless power transmitter may transmit the generated power based on at least one of an electromagnetic induction scheme, a radio wave reception scheme, and a resonance scheme.

The wireless power transmitter may wirelessly transmit the generated power by selecting one of an electromagnetic induction scheme, a radio wave reception scheme, and a resonance scheme, based on a distance to the robot cleaner.

The wireless power transmitter may use a frequency band of 50 MHz through 2.6 GHz when the wireless power transmitter transmits the generated power based on the radio wave reception scheme, and may use a frequency band of 80 KHz through 15 MHz when the wireless power transmitter transmits the generated power based on the resonance scheme.

The wireless power transmitter may comprise a wireless power transmitting unit to generate the power to be wirelessly transmitted, using a provided alternating current (AC), and a source resonator to transmit, to a target resonator, the generated power by energy-coupling with the target resonator of the robot cleaner.

The robot cleaner may comprise a target resonator to receive the wirelessly transmitted power by energy-coupling with the source resonator, a wireless power receiving unit to convert the received power into the rated voltage, and a battery controller to check a remaining capacity of the battery based on the scope of the predetermined area to be cleaned, and to charge the battery using the rated voltage.

The wireless power receiving unit may comprise an AC/DC converter to convert the power that is an alternating signal into a direct signal, and a DC converter to adjust a level of the direct signal that is converted by the AC/DC converter, and to output the rated voltage.

The battery controller may control the robot cleaner to charge the battery when the remaining capacity of the battery is less than a predetermined capacity.

The battery controller may detect a location of the wireless power transmitter and may move the robot cleaner towards the wireless power transmitter to charge the battery, when the battery is to be charged and wireless charging is not available in the detected location.

In another aspect, there is provided a wirelessly charged robot cleaner, the robot cleaner comprising a target resonator to receive a resonance power through energy-coupling with a source resonator of a wireless power transmitter, a wireless power receiving unit to convert the received resonance power into a rated voltage, and a battery controller to check a remaining capacity of the battery based on a scope of a predetermined area to be cleaned, and to charge the battery using the rated voltage.

The wireless power receiving unit may comprise an AC/DC converter to convert the resonance power that is an alternating signal into a direct signal, and a DC converter to adjust a level of the direct signal that is converted from the AC/DC converter, and to output the rated voltage.

The battery controller may control the robot cleaner to charge the battery when the remaining capacity of the battery is less than a predetermined capacity.

The battery controller may detect a location of the wireless power transmitter and may move the robot cleaner towards the wireless power transmitter to charge the battery, when the battery is to be charged and wireless charging is not available in the detected location.

The robot cleaner may further comprise a cleaner controller to control the robot cleaner to operate in a cleaning mode to perform a predetermined cleaning operation when a cleaning event is sensed, wherein the robot cleaner operates in the cleaning mode while the target resonator of the robot cleaner simultaneously receives the resonance power through energy-coupling with the source resonator of a wireless power transmitter.

The battery controller may control the robot cleaner to move towards the wireless power transmitter to charge the battery when the remaining capacity of the battery is less than the predetermined capacity while the robot cleaner is operating in the cleaning mode.

In another aspect, there is provided a method of controlling a wirelessly charged robot cleaner, the method comprising receiving a resonance power through energy-coupling with a source resonator of a wireless power transmitter, converting the received resonance power into a rated voltage, and charging a battery using the rated voltage.

The converting may comprise converting the resonate power that is an alternating signal into a direct signal, adjusting a level of the direct signal, and outputting the rated voltage.

The receiving may comprise receiving the resonance power when a remaining capacity of the battery is less than a predetermined capacity, based on a scope of an area to be cleaned.

The method may further comprise detecting a location of the wireless power transmitter and moving towards the wireless power transmitter, when the battery is to be charged and wireless charging is not available in the detected location, wherein the detecting and the moving is performed before receiving the resonance power.

The method may further comprise controlling the robot cleaner to operate in a cleaning mode to perform a predetermined cleaning operation when a cleaning event is sensed, wherein the robot cleaner operates in the cleaning mode while the target resonator of the robot cleaner simultaneously receives the resonance power through energy-coupling with the source resonator of a wireless power transmitter.

The method may further comprise moving towards the wireless power transmitter to charge the battery when the remaining capacity of the battery is less than the predetermined capacity while the robot cleaner is operating in the cleaning mode.

In another aspect, there is provided a wireless power transmitter for transmitting power wirelessly to a robot cleaner, the wireless power transmitter comprising a wireless power transmitting unit configured to generate power to be wirelessly transmitted to a robot cleaner, a communicating unit configured to receive information from the robot cleaner about an amount of power to be charged and a location of the robot cleaner, and a source resonator configured to wirelessly transmit the generated power to the robot cleaner.

The wireless power transmitter may further comprise a controller configured to determine whether to charge the robot cleaner, based on the amount of distance between the robot cleaner and the wireless power transmitter.

The source resonator may be configured to wirelessly transmit power to the robot cleaner using an electromagnetic induction scheme, a radio wave reception scheme, and a resonance scheme, and the controller may select which scheme to transmit power to the robot cleaner based on the distance between the robot cleaner and the wireless power transmitter.

In response to receiving a request for charging from the robot cleaner, the communicating unit may provide information about the location of the wireless power transmitter to the robot cleaner.

Other features and aspects will be apparent from the following detailed description, the drawings, and the claims.

Figure 1:
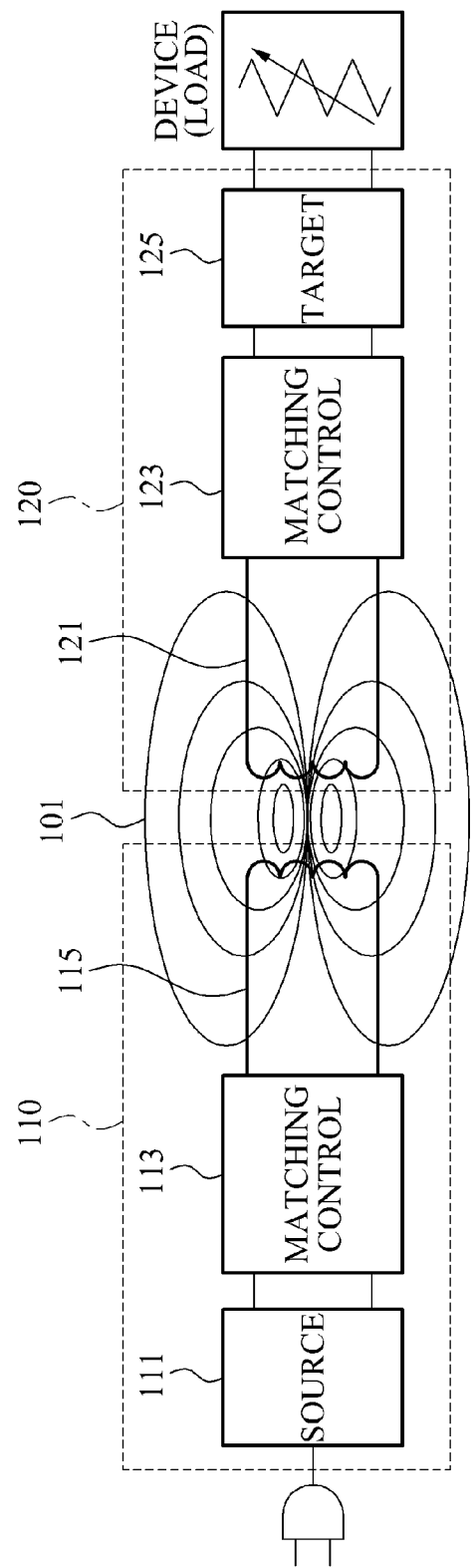
FIG. 1 is a diagram illustrating an example of a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Wireless power transmission technology may be classified as an electromagnetic induction scheme, a radio wave reception scheme, and a magnetic field resonance scheme.

When two coils are close enough to each other and an alternating current is flowing through one of the coils, a magnetic flux is generated and an electromotive force is induced in the other coil. An electromagnetic induction scheme may be based on this phenomenon. For example, the electromagnetic induction scheme may have approximately 60% to 98% efficiency in using power, and thus, the electromagnetic induction may be relatively efficient and practical.

The radio wave reception scheme may use radio wave energy that is received via an antenna and may obtain power by converting a waveform of an alternating radio waves into a direct current (DC), based on a rectifier circuit. For example, the radio wave reception scheme may perform wireless power transmission over several meters, which is an advantage of this scheme. However, the radio wave reception scheme may emit an electromagnetic wave, and may waste a large amount of power outputted from a transmitter as a radio wave, and thus, may have a low transmission efficiency.

The resonance scheme is based on a resonance of an electric field or a magnetic field. The resonance scheme may use a near field effect in a relatively short distance compared with a wavelength of a used frequency. The resonance scheme may be a non-radiative energy transmission that is different from the radio wave reception scheme, and may unify resonance frequencies of a transmitter and a receiver to transmit power. An efficiency of the resonance scheme in using power may increase by approximately 50% to 60%, which is relatively higher than the radio wave reception scheme emitting an electromagnetic wave. A distance between the transmitter and the receiver of the resonance scheme may be about several meters, which is used in a relatively near distance as compared to the radio wave reception scheme. However, the resonance scheme may be capable of transmitting power over a relatively longer distance in comparison to the electromagnetic induction scheme. In addition, power may be transferred only to a device that has the same resonance frequency as the transmitter, and thus, may generate minimal affect on a human body or on other devices.

FIG. 1 illustrates an example of a wireless power transmission system.

In this example, power is transmitted wirelessly using the wireless power transmission system may be referred to as resonance power.

Referring to FIG. 1, the wireless power transmission system may have a source-target structure that includes a source and a target. In this example, the wireless power transmission system includes a resonance power transmitter 110 corresponding to the source and a resonance power receiver 120 corresponding to the target.

The resonance power transmitter 110 includes a source unit 111 and a source resonator 115. The source unit 111 may receive energy from an external voltage supplier which may be used to generate resonance power. The resonance power transmitter 110 may further include a matching control 113 to perform resonance frequency or impedance matching.

For example, the source unit 111 may include an alternating current (AC)-to-AC (AC/AC) converter, an AC-to-direct current (DC) (AC/DC) converter, and a (DC/AC) inverter. The AC/AC converter may adjust a signal level of an AC signal input from an external device to a desired level. The AC/DC converter may output a DC voltage at a predetermined level by rectifying an AC signal output from the AC/AC converter. The DC/AC inverter may generate an AC signal, for example, a signal of a few megahertz (MHz) to tens of MHz band by quickly switching a DC voltage output from the AC/DC converter.

The matching control 113 may set at least one of a resonance bandwidth and an impedance matching frequency of the source resonator 115. Although not illustrated, the matching control 113 may include at least one of a source resonance bandwidth setting unit and a source matching frequency setting unit. The source resonance bandwidth setting unit may set the resonance bandwidth of the source resonator 115. The source matching frequency setting unit may set the impedance matching frequency of the source resonator 115. In this example, a Q-factor of the source resonator 115 may be determined based on the setting of the resonance bandwidth of the source resonator 115 or the setting of the impedance matching frequency of the source resonator 115.

The source resonator 115 may transfer electromagnetic energy to a target resonator 121, as shown in FIG. 1. For example, the source resonator 115 may transfer resonance power to the resonance power receiver 120 through magnetic coupling 101 with the target resonator 121. The source resonator 115 may resonate within the set resonance bandwidth.

In this example, the resonance power receiver 120 includes the target resonator 121, a matching control 123 to perform resonance frequency or impedance matching, and a target unit 125 to transfer the received resonance power to a load.

The target resonator 121 may receive electromagnetic energy from the source resonator 115. The target resonator 121 may resonate within the set resonance bandwidth.

The matching control 123 may set at least one of a resonance bandwidth and an impedance matching frequency of the target resonator 121. Although not illustrated, the matching control 123 may include at least one of a target resonance bandwidth setting unit and a target matching frequency setting unit. The target resonance bandwidth setting unit may set the resonance bandwidth of the target resonator 121. The target matching frequency setting unit may set the impedance matching frequency of the target resonator 121. In this example, a Q-factor of the target resonator 121 may be determined based on the setting of the resonance bandwidth of the target resonator 121 or the setting of the impedance matching frequency of the target resonator 121.

The target unit 125 may transfer the received resonance power to the load. For example, the target unit 125 may include an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

As an example, the source resonator 115 and the target resonator 121 may be configured in a helix coil structured resonator, a spiral coil structured resonator, a meta-structured resonator, and the like.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. For example, the resonance bandwidth of the source resonator 115 may be set wider or narrower than the resonance bandwidth of the target resonator 121. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In wireless power transmission employing a resonance scheme, the resonance bandwidth may be taken into consideration. For example, when the Q-factor considering a change in distance between the source resonator 115 and the target resonator 121, a change in the resonance impedance, impedance mismatching, a reflected signal, and the like, is Qt, Qt may have an inverse-proportional relationship with the resonance bandwidth, as given by Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ corresponds to a central frequency, $\Delta f$ corresponds to a change in a bandwidth, $\Gamma_{S,D}$ corresponds to a reflection loss between the source resonator 115 and the target resonator 121, BWS corresponds to the resonance bandwidth of the source resonator 115, and BWD corresponds to the resonance bandwidth of the target resonator 121. For example, the BW-factor may indicate either 1/BWS or 1/BWD.

For example, a change in the distance between the source resonator 115 and the target resonator 121, a change in a location of at least one of the source resonator 115 and the target resonator 121, and the like, may cause impedance mismatching between the source resonator 115 and the target resonator 121. The impedance mismatching may be a direct cause in decreasing an efficiency of power transfer. When a reflected wave corresponding to a transmission signal that is partially reflected and returned is detected, the matching control 113 may determine that the impedance mismatching has occurred, and may perform impedance matching. For example, the matching control 113 may change a resonance frequency by detecting a resonance point through a waveform analysis of the reflected wave. The matching control 113 may determine, as the resonance frequency, a frequency that has a minimum amplitude in the waveform of the reflected wave. That is, to improve wireless power transfer, the matching control 113 may change the resonance frequency such that the reflected wave that is in response to the resonance frequency, has a minimum amplitude.

Figure 2:
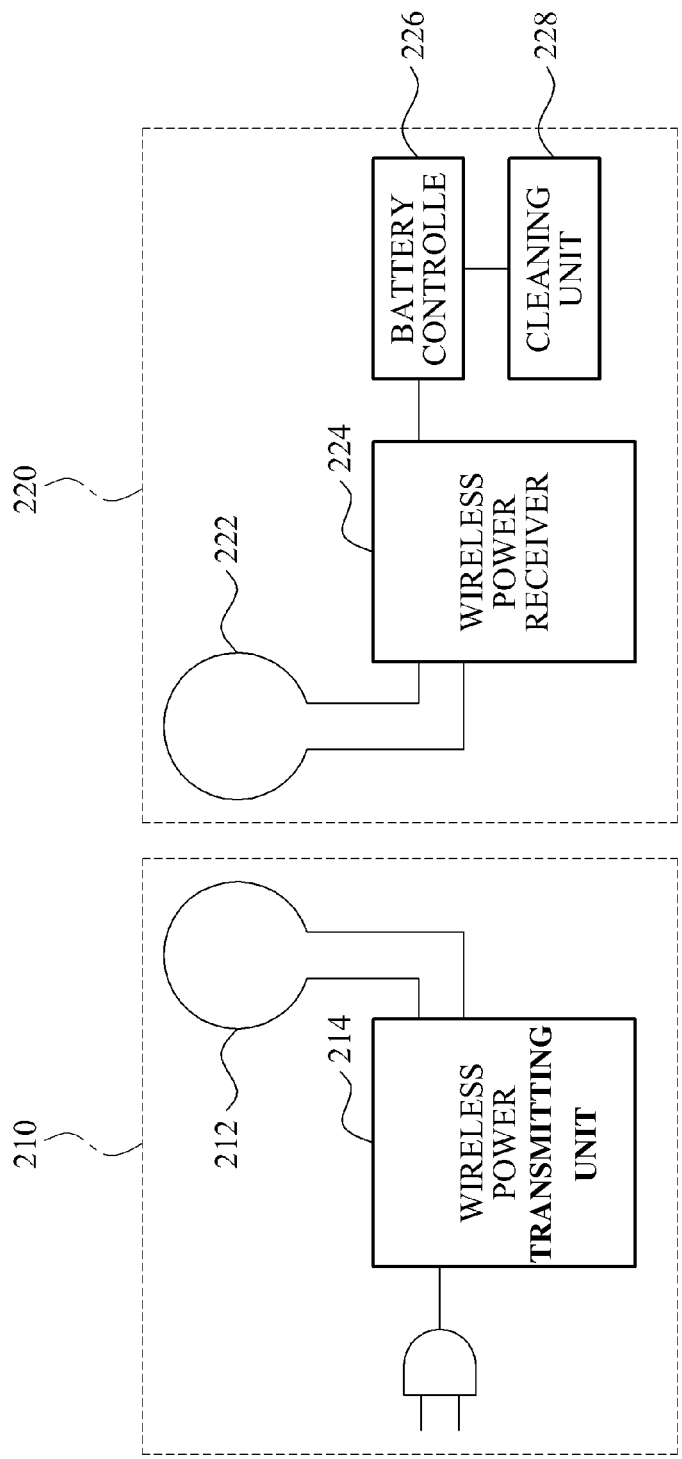
FIG. 2 is a diagram illustrating an example of a robot cleaning system that wirelessly charges power.

FIG. 2 illustrates an example of a robot cleaning system that wirelessly charges power. Referring to FIG. 2, the robot cleaning system includes a wireless power transmitter 210 and a robot cleaner 220.

The wireless power transmitter 210 may generate power using a provided power supply and may wirelessly transmit the generated power. The robot cleaner 220 may operate in a cleaning mode based on a scope of a predetermined area to be cleaned, may receive and convert wirelessly transmitted power into a rated voltage, and may charge a battery using the rated voltage.

For example, the wireless power transmitter 210 may wirelessly transmit power based on at least one of an electromagnetic induction scheme, a radio wave reception scheme, and a resonance scheme.

Referring to FIG. 2, the robot cleaning system that wirelessly transmits power based on the resonance scheme, using the wireless power transmitter 210 and the robot cleaner 220 is described below.

Figure 4:
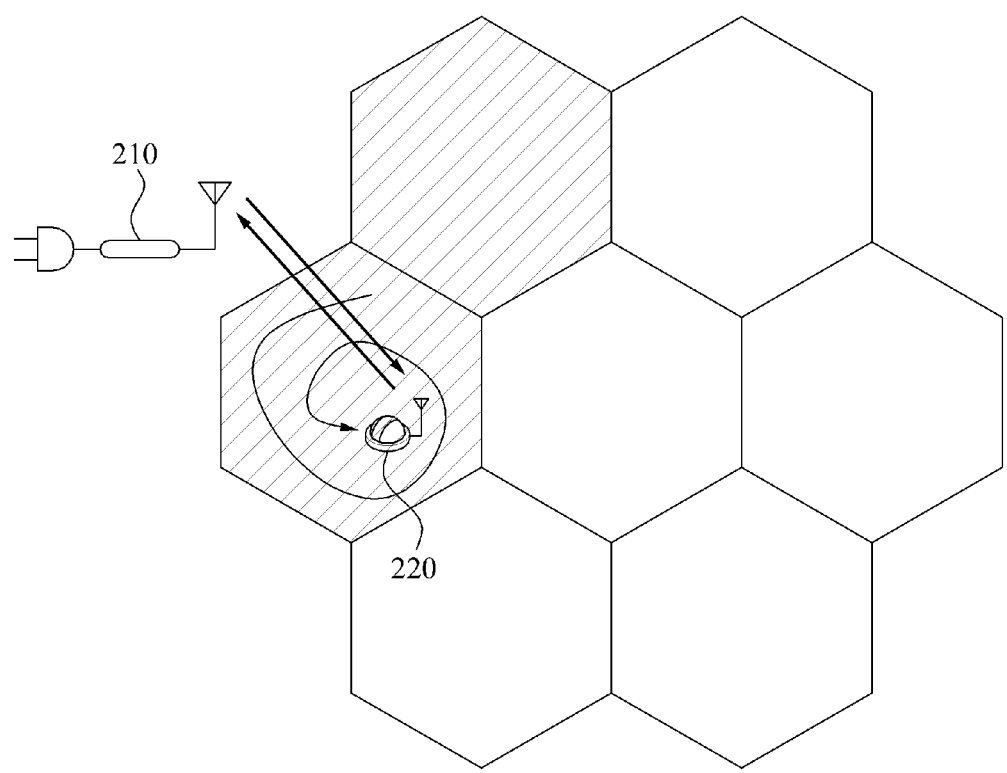
FIG. 4 is a diagram illustrating an example of charging a robot cleaner while it operates in a cleaning mode.

In this example, the wireless power transmitter 210 includes a source resonator 212 and a wireless power transmitting unit 214. The wireless power transmitting unit 214 may generate resonance power using an alternating power supply, and may transmit the generated resonance power to the source resonator 212 for resonance power transmission. The source resonator 212 may provide the resonance power generated from the wireless power transmitter 210 to the robot cleaner 220. An example of the wireless power transmitter 210 is illustrated in FIG. 4.

For example, the wireless power transmitter 210 may wirelessly transmit power by selecting one of an electromagnetic induction scheme, a radio wave reception scheme, and a resonance scheme, based on a distance between the robot cleaner 220 and the wireless power transmitter 210.

The robot cleaner 220 includes a target resonator 222, a wireless power receiving unit 224, a battery controller 226, and a cleaning unit 228. In this example, the robot cleaner 220 may operate in a cleaning mode based on the scope of a predetermined area that is to be cleaned.

The target resonator 222 may receive the resonance power transmitted from the wireless power transmitter 210 through energy-coupling with the source resonator 212 of the wireless power transmitter 210. The target resonator 222 may transmit the received resonance power to the wireless power receiving unit 224.

The wireless power receiving unit 224 may convert the resonance power received by the target resonator 222 into a current and a voltage to be used for powering the robot cleaner.

The battery controller 226 may check the remaining capability of a battery (not illustrated) and may charge the battery using the current and the voltage converted by the wireless power receiving unit 224, based on the remaining capability of the battery.

The cleaner 228 may perform a predetermined operation to perform cleaning based on the control of a cleaner controller (not illustrated).

Figure 5:
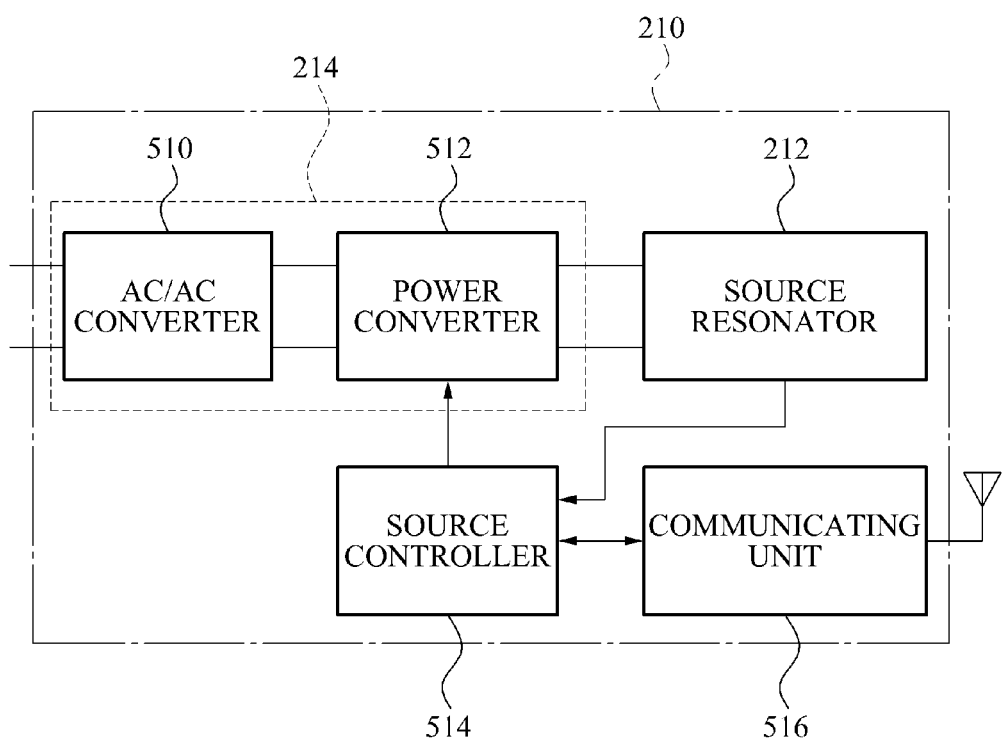
FIG. 5 is a diagram illustrating an example of a wireless power transmitter of a robot cleaning system.

An example of the robot cleaner 220 is illustrated in FIG. 5.

According to the example shown in FIG. 2, the robot cleaning system may use the resonance scheme to wirelessly transmit power. However, other wireless power transmission schemes may be used.

As the source resonator 212 and the target resonator 222 become closer to each other, an/or as the source resonator 212 and the target resonator come closer to facing each other, an efficiency in transmitting a resonance power from the wireless power transmitter 214 to the robot cleaner 220 may increase.

A location of the source resonator 212 and the target resonator 222, in which the transmission efficiency of the resonance power is high is described with reference to the example illustrated in FIG. 3.

Figure 3:
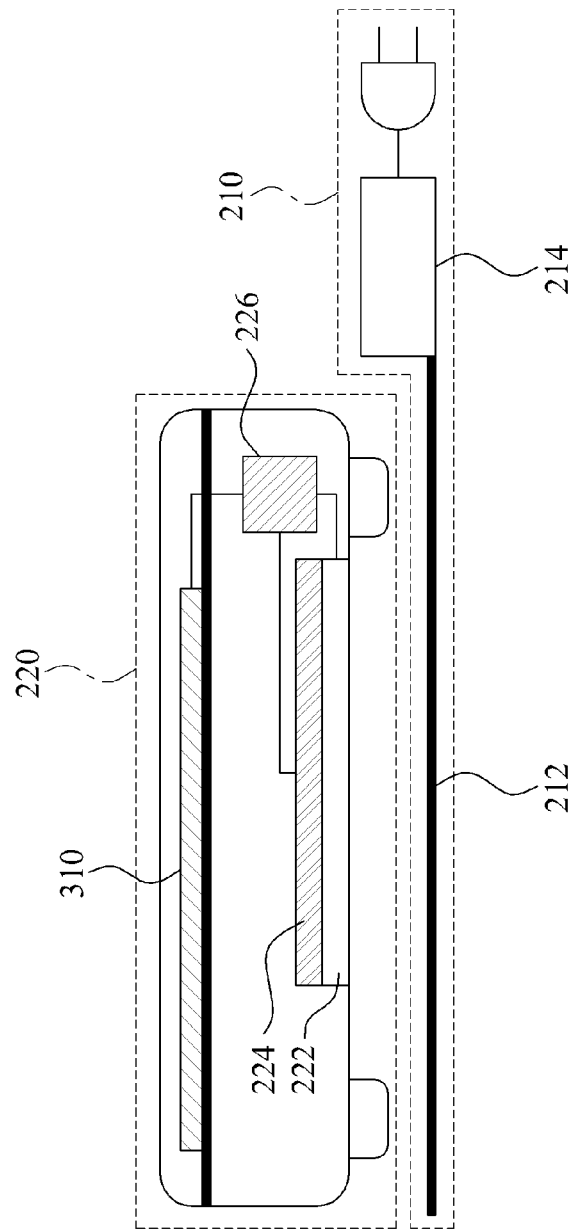
FIG. 3 is a diagram illustrating an, example of a source resonance and a target resonance in a robot cleaning system.

FIG. 3 illustrates an example of a source resonance and a target resonance in a robot cleaning system.

Referring to FIG. 3, a source resonator 212 is located in a wireless power transmitter 210 and the target resonator 222 is located at a bottom of the robot cleaner 220. In this example, the source resonator 212 and the target resonator face each other and are relatively close to each other, to transmit resonance power. In FIG. 3 the robot cleaner 220 is close to the wireless power transmitter 210 to efficiently charge power. However, the robot cleaner 220 may be capable of charging power when the robot cleaner 220 is at a greater distance away from the wireless power transmitter 210, for example, a distance of several meters away from the wireless power transmitter 210.

The robot cleaner 220 may convert the resonance power received by the target resonator 222 into a current and a voltage to derive power using the wireless power receiving unit 224. Accordingly, the robot cleaner 220 may charge a battery 310 based on a control of a battery controller 226.

The wireless power transmitter 210 may dynamically select one of a resonance scheme and a radio wave reception scheme to wirelessly transmit power based on the distance to the robot cleaner 220. For example, when the robot cleaner 220 is close to the wireless power transmitter 210, the wireless power transmitter 210 may transmit power based on the resonance scheme, and when the robot cleaner 220 is farther from the wireless power transmitter 210 more than a predetermined distance, the wireless power transmitter 210 may transmit power based on the radio wave reception scheme. As an example, the radio wave reception scheme may transmit power using a frequency band of 50 MHz through 2.6 GHz, and the resonance scheme may transmit power using a frequency band of 80 KHz through 15 MHz.

When the wireless power transmitter 210 transmits power based on the radio wave reception scheme, the robot cleaner 220 may wirelessly receive power within several meters. Accordingly, the robot cleaner 220 may simultaneously perform cleaning and charging while power is being received based on the radio wave reception scheme.

However, when the wireless power transmitter 210 transmits power based on the radio wave reception scheme, a transmission efficiency of power may vary based on a distance, and thus, the charging may be performed in a location with a high transmission efficiency.

For example, when the robot cleaner 220 receives power based on the radio wave reception, the robot cleaner 220 may perform cleaning while charging power in a predetermined area with a high efficiency.

FIG. 4 illustrates an example of charging a robot cleaner while it operates in a cleaning mode.

Referring to FIG. 4, when the robot cleaner 220 receives power based on a radio wave reception scheme, the robot cleaner 220 may charge power in an area that has a high power reception efficiency while performing cleaning. In this example, the area that has a high power reception efficiency is shaded.

FIG. 5 illustrates an example of a wireless power transmitter of a robot cleaning system.

Referring to FIG. 5, the wireless power transmitter 210 includes an AC/AC converter 510, a power converter 512, a source resonator 212, a source controller 514, and a communicating unit 516.

The AC/AC converter 510 may receive an alternating power supply, may convert the received alternating power supply into an alternating power supply, for example, a power supply of 85VAC through 265VAC/60 Hz, and may transmit the converted alternating power supply to the power converter 512.

The power converter 512 may convert an alternating power supply, for example, a power supply of 60 Hz into an alternating signal of 2 to 15 MHz and may transmit the alternating signal to the source resonator 212.

As another example, the power converter 512 may convert the alternating power supply of 60 Hz into a direct current using an AC/DC converter (not illustrated) and then may convert the direct current into an alternating power supply using a DC/AC converter (not illustrated). In this example, when the AC/DC converter may use a diode. However, a VD voltage and a Ron resistance of a diode may cause a power loss, and thus, a Shottky diode may be used to reduce power loss.

The source controller 514 may control the AC/AC converter 510, the power converter 512, and the source resonator 212, to generate voltage and power used for to the target resonator 222. The source controller 514 or controller for short may determine whether to charge the robot cleaner 220, based on the amount of distance between the robot cleaner and the wireless power transmitter 210.

As another example, the controller 514 may selects which scheme to transmit power to the robot cleaner 220 based on the distance between the robot cleaner 220 and the wireless power transmitter 210.

The communicating unit 516 may communicate with the robot cleaner 220 and may receive information from the robot cleaner 220, for example, information associated with an amount of power to be used by the robot cleaner 220, and the like. The communicating unit 516 may provide information associated with a location of the wireless power transmitter 210 in response to a request from the robot cleaner 220.

Figure 6:
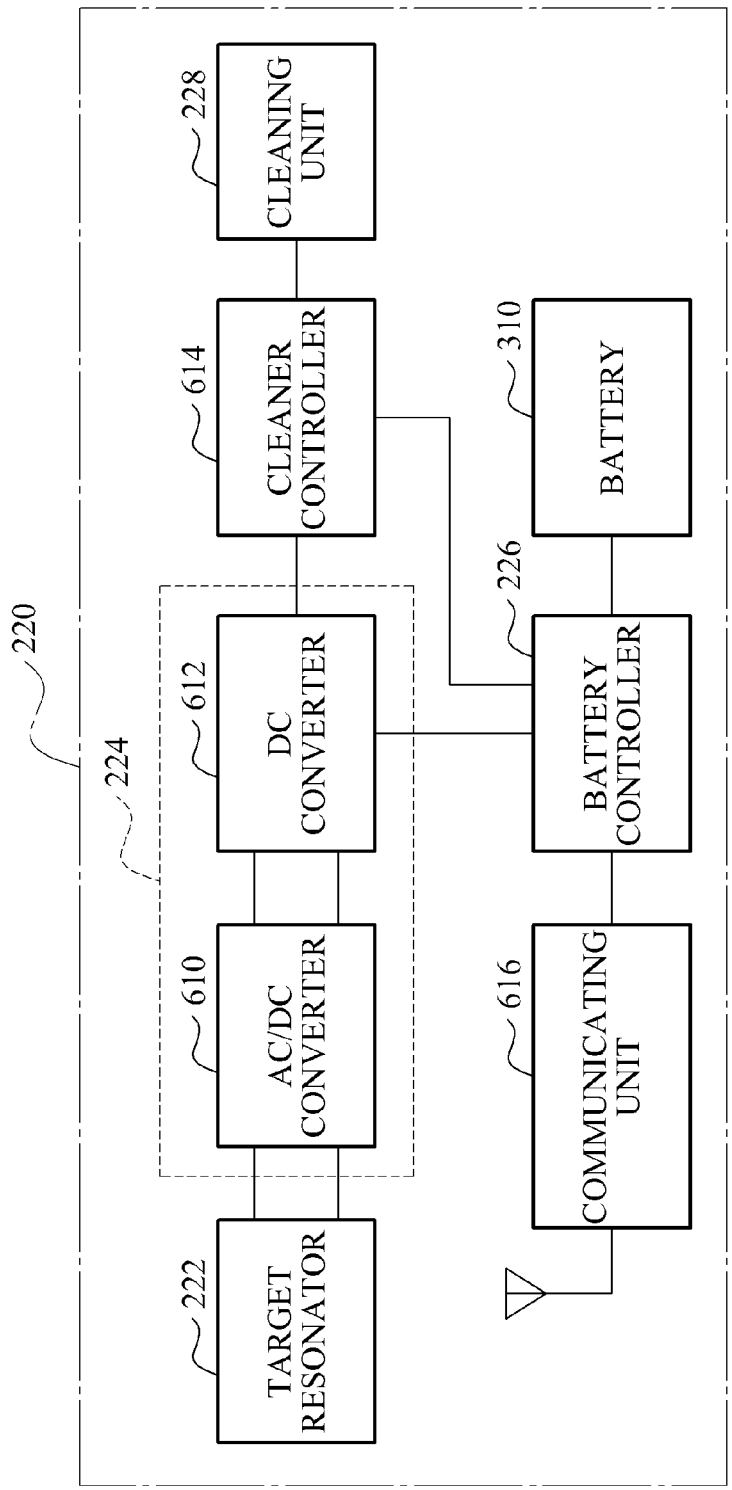
FIG. 6 is a diagram illustrating an example of a robot cleaner of a robot cleaning system.

FIG. 6 illustrates an example of a robot cleaner of a robot cleaning system.

Referring to FIG. 6, robot cleaner 220 includes a target resonator 222, an AC/DC converter 610, a DC converter 612, a cleaner controller 614, a cleaning unit 228, a battery controller 226, a battery 310, and a communicating unit 616.

The AC/DC converter 610 may convert an alternating signal received by the target resonator 222 into a direct signal. In this example, when the AC/DC converter 610 passes an output such as an external electromagnetic interference (EMI) or surge, a circuit may be destroyed. Thus, an EMI filter or an electro static discharge (ESD) may be further included in the AC/DC converter 610.

The DC converter 612 may adjust a level of the direct signal to generate a rated voltage to be used by the robot cleaner 220. A DC voltage level that is adjusted by the DC converter 612 may be used to charge the battery 310 based on a control of the battery controller 226 or may be consumed by the robot cleaner 220.

The cleaner controller 614 may sense a cleaning event. A user may input an area that the user desires to be cleaned or a cleaning operation when the cleaner controller 614 senses the cleaning event. Examples of the inputted area to be cleaned may include a large area, a medium area, a small area, and the like.

Examples of the inputted cleaning operation may include a cleaning route, a cleaning time, and the like. For example, the cleaning route may include a route along an inward spiral pattern, a route following an outward spiral pattern, a route following a zigzag pattern, and the like. As another example, the cleaning route may be random.

The cleaner controller 614 may sense a cleaning event, and when a remaining capacity of the battery 310 is greater than or equal to a predetermined capacity, the cleaner controller 614 may operate in a cleaning mode to control the cleaning unit 228 to perform the cleaning operation. For example, the predetermined remaining capacity may be set to be different based on a scope of an area inputted when the cleaning event is generated.

When the battery controller 226 determines that the battery 310 is to be charged, the cleaner controller 614 may convert the cleaning mode into a charging mode to charge the battery 310 based on a control of the battery controller 226. Examples of predetermined operations of the cleaning mode include moving according to a cleaning route, a detouring when a drop-off or an obstacle is sensed, and the like.

When the battery controller 226 determines that the battery 310 is to be charged, the cleaner controller 614 may control the robot cleaner 220 to operate in a cleaning mode and to charge the battery 310 simultaneously within a distance in which wireless charging is available.

The communicating unit 616 may communicate with the wireless power transmitter 210 and may transmit information associated with an amount power to be used, and the like. For example, the communicating unit 616 may request a location of the wireless power transmitter 210 and may receive the location of the wireless power transmitter 210.

A method of controlling a wirelessly charged robot cleaner is described below.

Figure 7:
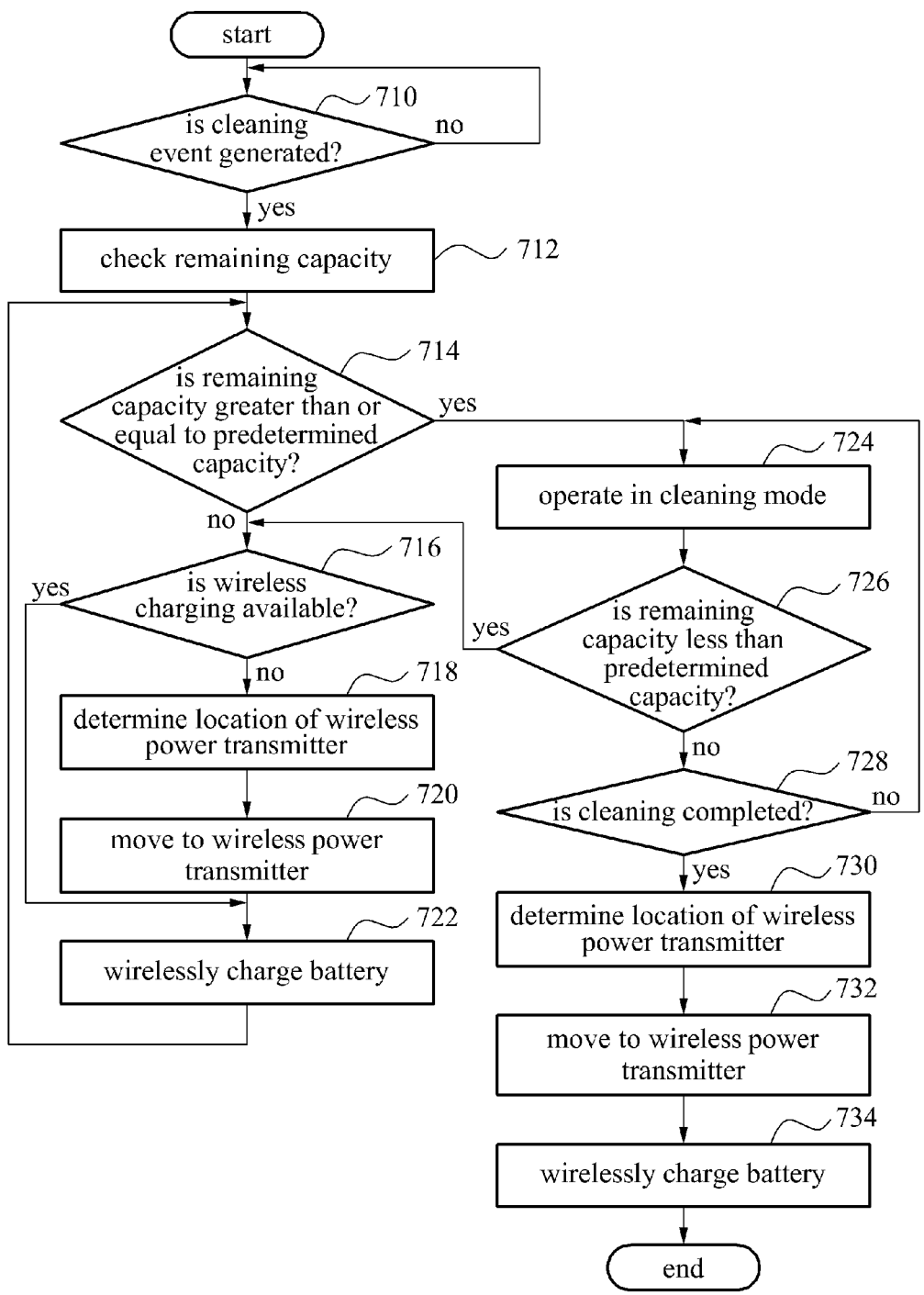
FIG. 7 is a flowchart illustrating an example of a method of a robot cleaner.

FIG. 7 illustrates an example of a method of a robot cleaner.

Referring to FIG. 7, when the robot cleaner senses that a cleaning event is generated, in 710, the robot cleaner checks the remaining capacity of a battery, in 712. When the robot cleaner senses that the cleaning event is generated, the robot cleaner may receive a user's input associated with a scope of an area to be cleaned. Examples of the inputted area to be cleaned include a large area, a medium area, a small area, and the like. The robot cleaner may receive a user's input associated with a cleaning operation when the robot cleaner senses that the cleaning event is generated. Examples of the cleaning operation include a cleaning route, a cleaning time, and the like. The cleaning route may include a route along an approximately inward spiral pattern, a route along an approximately outward spiral pattern, a route following an approximately zigzag pattern, a random pattern, and the like.

The robot cleaner determines whether the remaining capacity of the battery is greater than or equal to a predetermined capacity, in 714. For example, the predetermined capacity may be set to a different value based on the scope of the cleaning area, inputted by the user, when the cleaning event is generated. That is, the predetermined capacity may include a plurality of values, for example, the capacity may include a greater value when the cleaning area input by the user is a larger area, and the capacity may include a smaller value when the cleaning area input by the user is a smaller area.

When the remaining capacity of the battery is less than the predetermined capacity in 714, the robot cleaner determines whether wireless charging by the wireless power transmitter is available, in 716. For example, whether the wireless charging is available may be determined based on a distance between the wireless power transmitter and the robot cleaner. A charging efficiency of the wireless charging may vary based on the distance to the wireless power transmitter. For example, the charging efficiency may be relatively higher when the robot cleaner is closer to the wireless power transmitter. When the robot cleaner is located in an area where the wireless charging is available, the robot cleaner may operate in a cleaning mode in the area where the wireless charging is available, and may charge the battery simultaneously while cleaning.

When the wireless charging is not available in 716, the robot determines a location of the wireless power transmitter, in 718.

The robot cleaner moves towards the wireless power transmitter, in 720. The robot cleaner may be provided with power through a resonator from the wireless power transmitter, and thus, the battery of the robot cleaner is wirelessly charged, in 722. Then, the robot cleaner returns to 714.

When the wireless charging is available in 716, the robot cleaner converts a mode into the charging mode, and is wirelessly provided with power through the resonator from the wireless power transmitter, and thus, the battery of the robot cleaner is wirelessly charged, in 722. Then, the robot cleaner returns to 714.

When the remaining capacity of the battery is greater than or equal to the predetermined capacity in 714, the robot cleaner operates in the cleaning mode, in 724. Examples of predetermined operations of the cleaning mode include moving according to a cleaning route, detouring when a drop-off or an obstacle is sensed, and the like. In this example, when the scope of the area to be cleaned or a cleaning operation is input, the robot cleaner may operate in the cleaning mode based on the inputted scope of the area to be cleaned and the cleaning operation as illustrated in FIG. 7.

In 726, the robot cleaner determines whether the remaining capacity of the battery is less than the predetermined capacity.

When the remaining capacity of the battery is less than the predetermined capacity in 726, the robot cleaner returns to 716 and performs 716 through 722.

When the remaining capacity of the battery is greater than or equal to the predetermined capacity in 726, the robot cleaner determines whether cleaning is completed, in 728.

When the cleaning is not completed in 728, the robot cleaner returns to operation 724 and operates in the cleaning mode.

When the cleaning is completed in 728, the robot cleaner determines a location of the wireless power transmitter, in 730, and moves towards the wireless power transmitter, in 732. The robot cleaner operates in the charging mode, and is provided with power through a resonator from the wireless power transmitter and thus, the battery of the robot cleaner is wirelessly charged, in 734.

Figure 8:
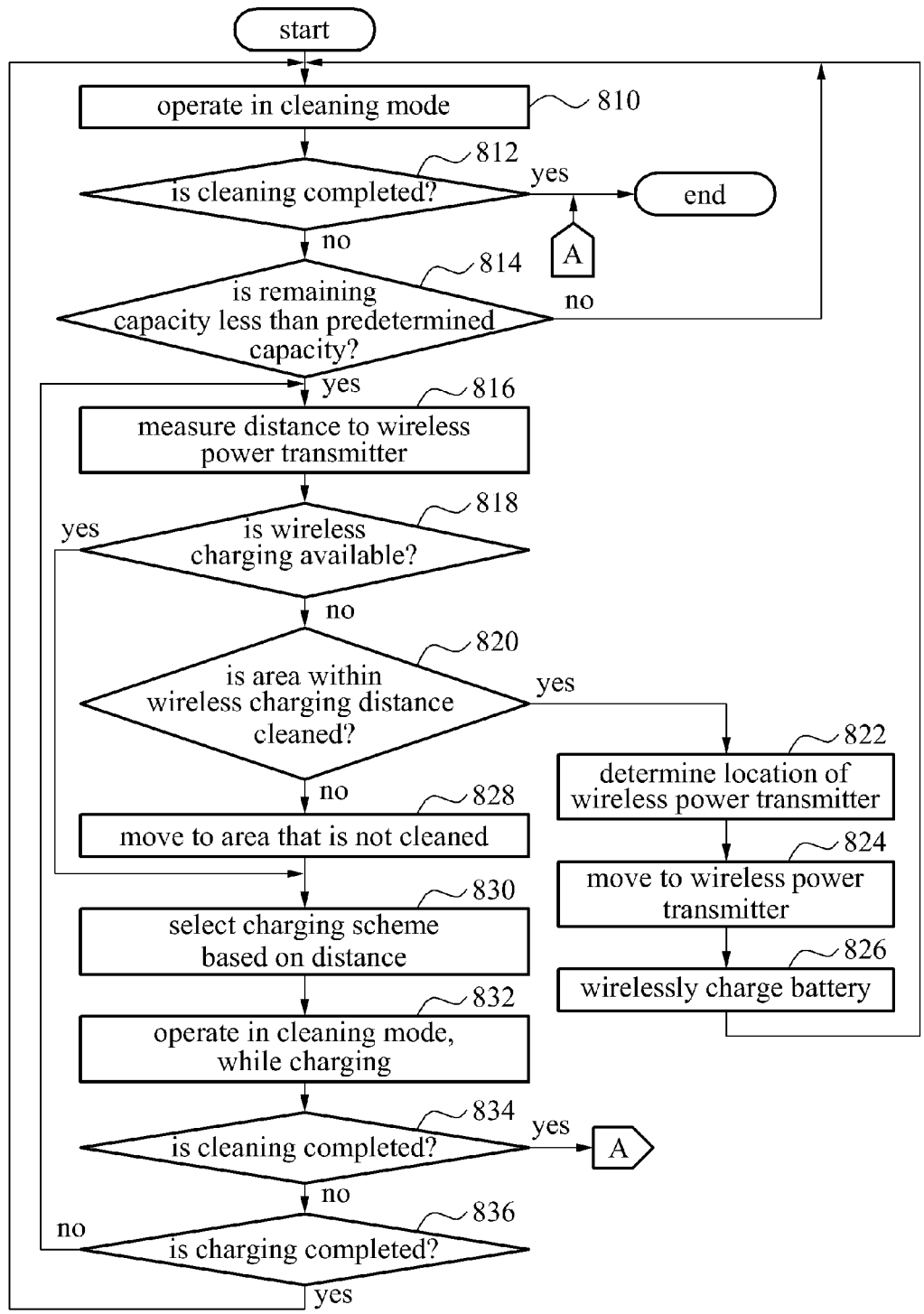
FIG. 8 is a flowchart illustrating an example of a method of charging a robot cleaner while it operates in a cleaning mode.

FIG. 8 illustrates an example of a method of charging a robot cleaner while it operates in a cleaning mode.

Referring to FIG. 8, the robot cleaner operates in a cleaning mode, in 810, and determines whether cleaning is completed, in 812.

When cleaning is not completed in 812, the robot cleaner determines whether a remaining capacity of a battery is less than a predetermined capacity, in 814. When the remaining capacity of the battery is greater than or equal to the predetermined capacity, the robot cleaner returns to 810 and operates in the cleaning mode.

When the remaining capacity of the battery is less than the predetermined capacity in 814, the robot cleaner measures a distance to the wireless power transmitter, in 816. The robot cleaner determines whether wireless charging is available based on the measured distance to the wireless power transmitter, in 818.

When the wireless charging is not available in 818, the robot cleaner determines whether an area within a wireless charging distance where wireless charging is available is cleaned, in 820.

When the area within the wireless charging distance is cleaned in 820, the robot cleaner determines a location of the wireless power transmitter, in 822.

The robot cleaner moves towards the wireless power transmitter, in 824. The robot cleaner operates in a charging mode, in 826, and is provided with power through a resonance from the wireless power transmitter. Accordingly, the battery is wirelessly charged. The robot cleaner returns to 810 and operates in the cleaning mode. In this example, the robot cleaner may store a location where the robot cleaner moves from, and may perform cleaning again from the location when the charging is completed.

When the area within the wireless charging distance is not cleaned in 820, the robot cleaner moves to an area that is not cleaned within the wireless charging distance, in 828, and proceeds with 830.

Also, when the wireless charging is available in 818, the robot cleaner proceeds with 830. In 830, the robot cleaner selects a charging scheme corresponding the distance to the wireless power transmitter. In this example, the corresponding charging scheme may be an electromagnetic induction scheme, a radio wave reception scheme, and/or a resonance scheme.

The robot cleaner cleans an area to be cleaned within the wireless charging distance, in 832. The robot cleaner determines whether the cleaning is completed, in 834.

When the cleaning is not completed in 834, the robot cleaner determines whether the charging is completed, in operation 836.

When the charging is not completed in 836, the robot cleaner returns to 816. When the charging is completed in 836, the robot cleaner returns to 810.

When the cleaning is completed in operation 812 or 834, the method finishes.

Figure 9:
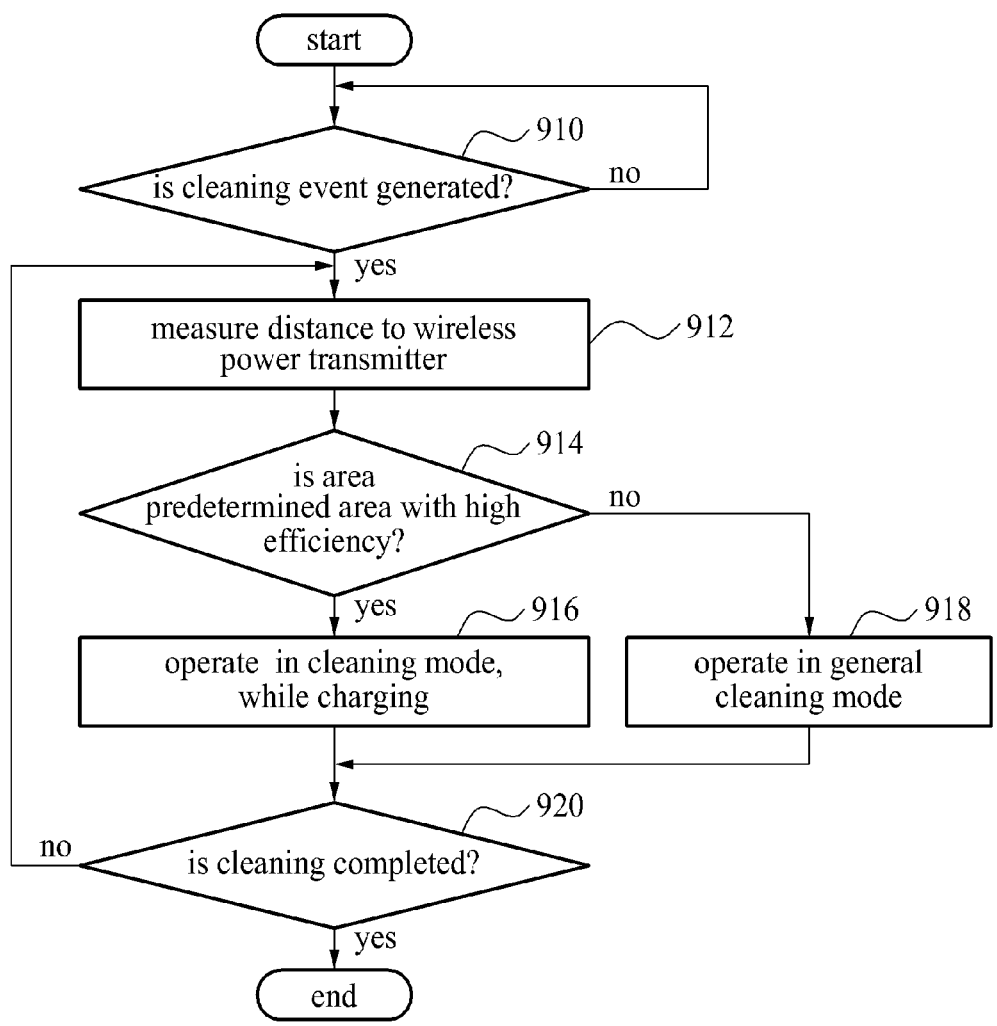
FIG. 9 is a flowchart illustrating an example of a method of charging a robot cleaner based on charge efficiency, while the robot cleaner operates in a cleaning mode.

FIG. 9 illustrates an example of charging a robot cleaner based on charge efficiency, while the robot cleaner operates in a cleaning mode.

Referring to FIG. 9, when the robot cleaner senses that a cleaning event is generated, in 910, the robot cleaner measures a distance to a wireless power transmitter, in 912.

In 914, the robot cleaner determines whether the measured distance to the wireless power transmitter is included in a predetermined area with a high efficiency.

When the measured distance is included in the area with the high efficiency in 914, the robot cleaner operates in a cleaning mode and charges a battery, in 916.

When the measured distance is not included in the area with the high efficiency in 914, the robot cleaner operates in a general cleaning mode, in 918. When the robot cleaner operates in the general cleaning mode, the robot cleaner may not charge the battery.

In 920, the robot cleaner determines whether cleaning is completed. When the cleaning is not completed in 920, the robot cleaner proceeds to 912. When the cleaning is completed in 920, the method is finished.

Figure 10:
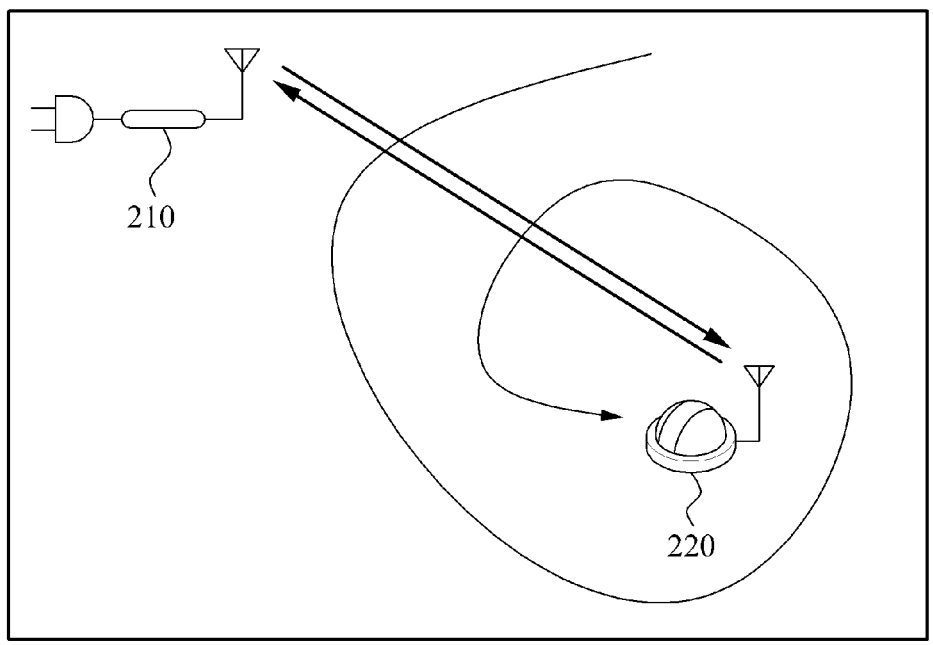
FIG. 10 is a diagram illustrating an example of a robot cleaner in operation.

FIG. 10 illustrates an example of a robot cleaner in operation.

Referring to FIG. 10, when an inputted area to be cleaned is a large area and an inputted cleaning route is a circle from an outside to a center, robot cleaner 220 performs cleaning corresponding to the large area based on the route from the outside to the center. In this example, the cleaning corresponding to the large area may be a cleaning time corresponding to the large area, a repeat count of the cleaning route corresponding to the large area, and the like.

When the robot cleaner 220 determines that a battery is to be charged while operating in a cleaning mode, the robot cleaner 220 may move to the wireless power transmitter 210 to charge or may charge the battery while operating in the cleaning mode within a wireless charging distance where the wireless charging is available.

For example, a source resonator and/or a target resonator may be configured as a helix coil structured resonator, a spiral coil structured resonator, a meta-structured resonator, and the like.

All materials may have a unique magnetic permeability (Mµ) and a unique permittivity epsilon (∈). The magnetic permeability indicates a ratio between a magnetic flux density that occurs with respect to a given magnetic field in a corresponding material and a magnetic flux density that occurs with respect to the given magnetic field in a vacuum state. The magnetic permeability and the permittivity may determine a propagation constant of a corresponding material at a given frequency or at a given wavelength. An electromagnetic characteristic of the corresponding material may be determined based on the magnetic permeability and the permittivity.

For example, a material having a magnetic permeability or a permittivity absent in nature and that is artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 11:
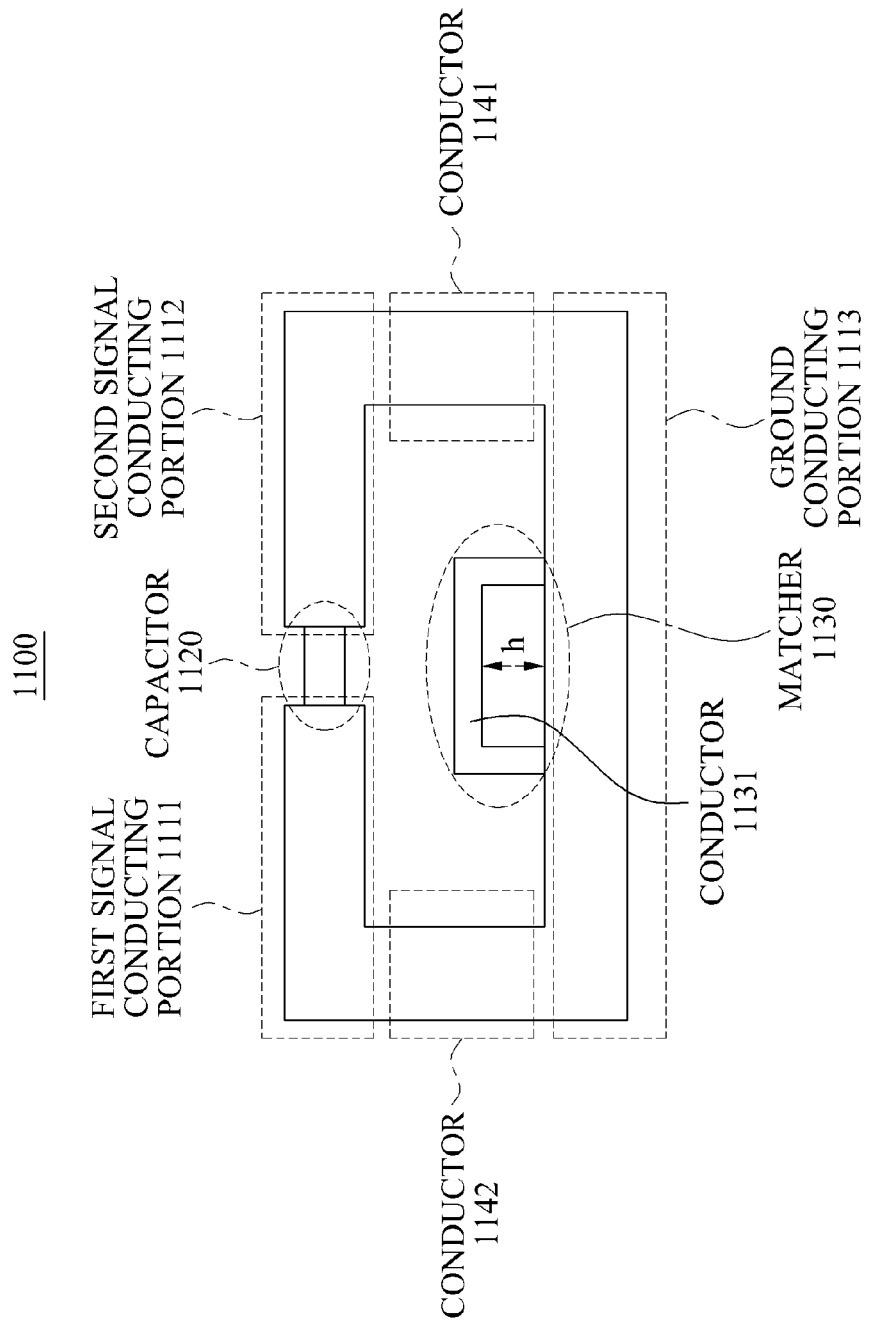
FIG. 11 through FIG. 17 are diagrams illustrating various examples of a resonator structure.

FIG. 11 illustrates a two-dimensional (2D) example of a resonator.

Referring to FIG. 11, resonator 1100 includes a transmission line, a capacitor 1120, a matcher 1130, and conductors 1141 and 1142. In this example, the transmission line includes a first signal conducting portion 1111, a second signal conducting portion 1112, and a ground conducting portion 1113.

The capacitor 1120 may be inserted in series between the first signal conducting portion 1111 and the second signal conducting portion 1112, and an electric field may be confined within the capacitor 1120. For example, the transmission line may include at least one conductor in an upper portion of the transmission line, and may also include at least one conductor in a lower portion of the transmission line. Current may flow through the at least one conductor disposed in the upper portion of the transmission line, and the at least one conductor disposed in the lower portion of the transmission may be electrically grounded. In this example, a conductor disposed in an upper portion of the transmission line is referred to as the first signal conducting portion 1111 and the second signal conducting portion 1112. A conductor disposed in the lower portion of the transmission line is referred to as the ground conducting portion 1113.

In this example, the transmission line includes the first signal conducting portion 1111 and the second signal conducting portion 1112 in the upper portion of the transmission line, and includes the ground conducting portion 1113 in the lower portion of the transmission line. For example, the first signal conducting portion 1111 and the second signal conducting portion 1112 may be disposed to face the ground conducting portion 1113. Current may flow through the first signal conducting portion 1111 and the second signal conducting portion 1112.

One end of the first signal conducting portion 1111 may be shorted to the conductor 1142, and another end of the first signal conducting portion 1111 may be connected to the capacitor 1120. One end of the second signal conducting portion 1112 may be grounded to the conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, such that the resonator 1100 has an electrically closed-loop structure. The term "loop structure" may include a polygonal structure, for example, a circular structure, a rectangular structure, and the like. The loop structure indicates a circuit that is electrically closed.

The capacitor 1120 may be inserted into an intermediate portion of the transmission line. For example, the capacitor 1120 may be inserted into a space between the first signal conducting portion 1111 and the second signal conducting portion 1112. The capacitor 1120 may have a shape of a lumped element, a distributed element, and the like. For example, a distributed capacitor that has the shape of the distributed element may include zigzagged conductor lines and a dielectric material that has a relatively high permittivity between the zigzagged conductor lines.

When the capacitor 1120 is inserted into the transmission line, the resonator 1100 may have a property of a metamaterial. The metamaterial indicates a material that has a predetermined electrical property that is absent in nature, and thus, may have an artificially designed structure. An electromagnetic characteristic of materials that exist in nature may have a unique magnetic permeability or a unique permittivity. Most materials may have a positive magnetic permeability or a positive permittivity. In the case of most materials, a right hand rule may be applied to an electric field, a magnetic field, and a pointing vector, and thus, the corresponding materials may be referred to as right handed materials (RHMs).

However, a metamaterial has a magnetic permeability or a permittivity absent in nature, and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is appropriately determined, the resonator 1100 may have the characteristic of the metamaterial. Because the resonator 1100 may have a negative magnetic permeability by adjusting the capacitance of the capacitor 1120, the resonator 1100 may also be referred to as an MNG resonator. Various criteria may be applied to determine the capacitance of the capacitor 1120. For example, the various criteria may include a criterion for enabling the resonator 1100 to have the characteristic of the metamaterial, a criterion for enabling the resonator 1100 to have a negative magnetic permeability in a target frequency, a criterion for enabling the resonator 1100 to have a zeroth order resonance characteristic in the target frequency, and the like. The capacitance of the capacitor 1120 may be determined based on one or more criterion.

The resonator 1100, also referred to as the MNG resonator 1100, may have a zeroth order resonance characteristic that has, as a resonance frequency, a frequency when a propagation constant is "0". For example, a zeroth order resonance characteristic may be a frequency transmitted through a line or a medium that has a propagation constant of "0." Because the resonator 1100 may have the zeroth order resonance characteristic, the resonance frequency may be independent with respect to a physical size of the MNG resonator 1100. By appropriately designing the capacitor 1120, the MNG resonator 1100 may sufficiently change the resonance frequency. Accordingly, the physical size of the MNG resonator 1100 may not be changed.

In a near field, the electric field may be concentrated on the capacitor 1120 inserted into the transmission line. Accordingly, due to the capacitor 1120, the magnetic field may become dominant in the near field. The MNG resonator 1100 may have a relatively high Q-factor using the capacitor 1120 of the lumped element, and thus, it is possible to enhance an efficiency of power transmission. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 1100 may include the matcher 1130 for impedance matching. The matcher 1130 may adjust the strength of a magnetic field of the MNG resonator 1100. An impedance of the MNG resonator 1100 may be determined by the matcher 1130. For example, current may flow into and/or out of the MNG resonator 1100 via a connector. The connector may be connected to the ground conducting portion 1113 or the matcher 1130. Power may be transferred through coupling without using a physical connection between the connector and the ground conducting portion 1113 or the matcher 1130.

For example, as shown in FIG. 11, the matcher 1130 may be positioned within the loop formed by the loop structure of the resonator 1100. The matcher 1130 may adjust the impedance of the resonator 1100 by changing the physical shape of the matcher 1130. For example, the matcher 1130 may include the conductor 1131 for the impedance matching in a location that is separated from the ground conducting portion 1113 by a distance h. Accordingly, the impedance of the resonator 1100 may be changed by adjusting the distance h.

Although not illustrated in FIG. 11, a controller may be provided to control the matcher 1130. In this example, the matcher 1130 may change the physical shape of the matcher 1130 based on a control signal generated by the controller. For example, the distance h between the conductor 1131 of the matcher 1130 and the ground conducting portion 1113 may increase or decrease based on the control signal. Accordingly, the physical shape of the matcher 1130 may be changed and the impedance of the resonator 1100 may be adjusted. The controller may generate the control signal based on various factors, which is further described later.

As shown in FIG. 11, the matcher 1130 may be configured as a passive element such as the conductor 1131. As another example, the matcher 1130 may be configured as an active element such as a diode, a transistor, and the like. When the active element is included in the matcher 1130, the active element may be driven based on the control signal generated by the controller, and the impedance of the resonator 1100 may be adjusted based on the control signal. For example, a diode that is a type of active element may be included in the matcher 1130. The impedance of the resonator 1100 may be adjusted depending on whether the diode is in an ON state or in an OFF state.

Although not illustrated in FIG. 11, a magnetic core may pass through the MNG resonator 1100. The magnetic core may increase the power transmission distance.

Figure 12:
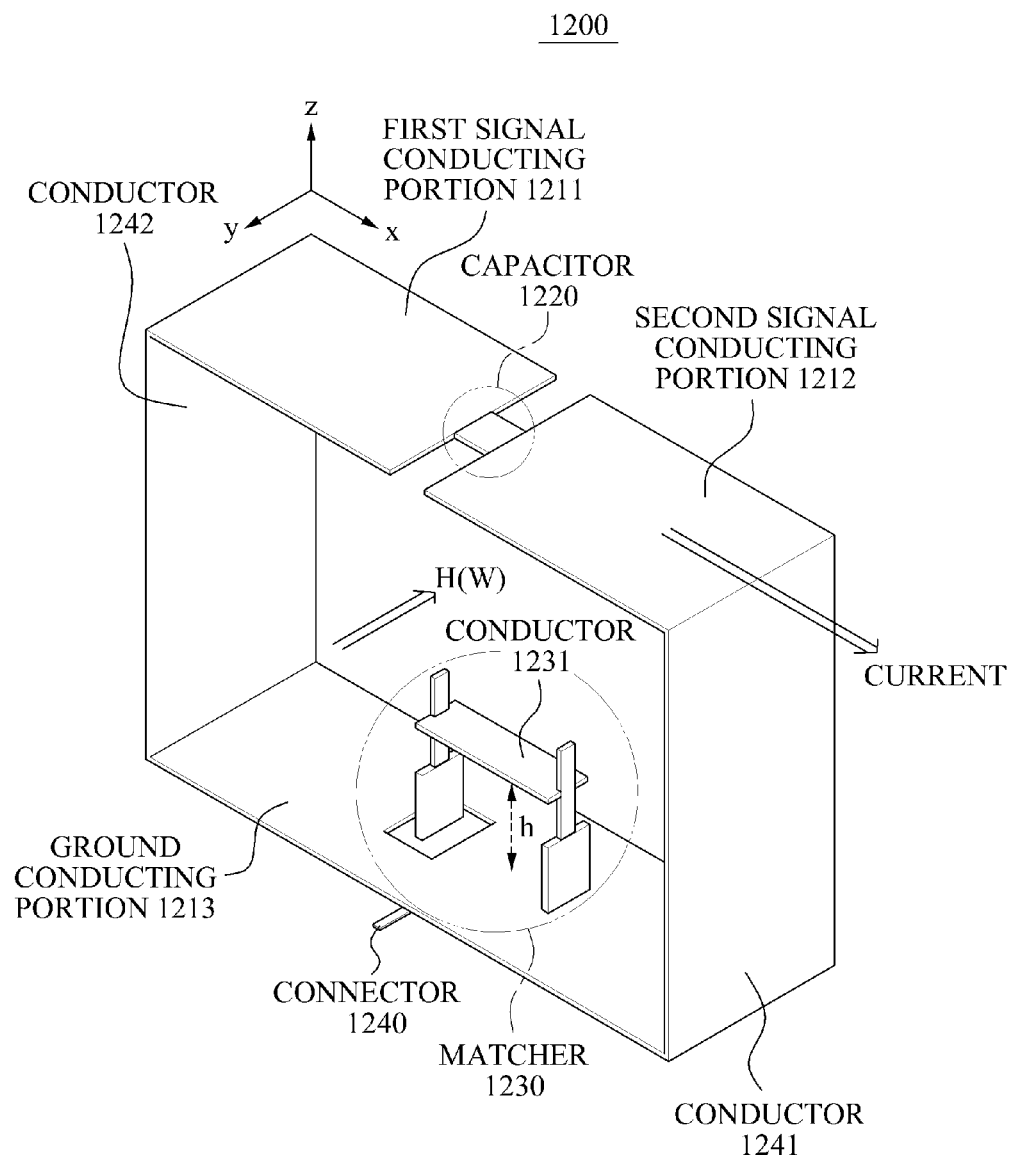

FIG. 12 illustrates a three-dimensional (3D) example of a resonator.

Referring to FIG. 12, resonator 1200 includes a transmission line and a capacitor 1220. In this example, the transmission line includes a first signal conducting portion 1211, a second signal conducting portion 1212, and a ground conducting portion 1213. The capacitor 1220 may be inserted in series between the first signal conducting portion 1211 and the second signal conducting portion 1212 of the transmission line, and an electric field may be confined within the capacitor 1220.

In this example, the transmission line includes the first signal conducting portion 1211 and the second signal conducting portion 1212 in an upper portion of the resonator 1200, and includes the ground conducting portion 1213 in a lower portion of the resonator 1200. For example, the first signal conducting portion 1211 and the second signal conducting portion 1212 may be disposed to face the ground conducting portion 1213. Current may flow in an x direction through the first signal conducting portion 1211 and the second signal conducting portion 1212. As a result of the current, a magnetic field H(W) may be formed in a −y direction. Alternatively, unlike the diagram of FIG. 12, the magnetic field H(W) may be formed in a +y direction.

One end of the first signal conducting portion 1211 may be shorted to the conductor 1242, and another end of the first signal conducting portion 1211 may be connected to the capacitor 1220. One end of the second signal conducting portion 1212 may be grounded to the conductor 1241, and another end of the second signal conducting portion 1212 may be connected to the capacitor 1220. Accordingly, the first signal conducting portion 1211, the second signal conducting portion 1212, the ground conducting portion 1213, and the conductors 1241 and 1242 may be connected to each other such that the resonator 1200 has an electrically closed-loop structure.

As shown in FIG. 12, the capacitor 1220 may be inserted between the first signal conducting portion 1211 and the second signal conducting portion 1212. For example, the capacitor 1220 may be inserted into a space between the first signal conducting portion 1211 and the second signal conducting portion 1212. The capacitor 1220 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 1220 is inserted into the transmission line, the resonator 1200 may have a property of a metamaterial.

When a capacitance of the capacitor inserted as the lumped element is appropriately determined, the resonator 1200 may have the characteristic of the metamaterial. Because the resonator 1200 may have a negative magnetic permeability by adjusting the capacitance of the capacitor 1220, the resonator 1200 may also be referred to as an MNG resonator. Various criteria may be applied to determine the capacitance of the capacitor 1220. For example, the various criteria may include a criterion for enabling the resonator 1200 to have the characteristic of the metamaterial, a criterion for enabling the resonator 1200 to have a negative magnetic permeability in a target frequency, a criterion enabling the resonator 1200 to have a zeroth order resonance characteristic in the target frequency, and the like. The capacitance of the capacitor 1220 may be determined based on one or more criterion.

The resonator 1200, also referred to as the MNG resonator 1200, may have a zeroth order resonance characteristic that has, as a resonance frequency, a frequency when a propagation constant is "0". For example, a zeroth order resonance characteristic may be a frequency transmitted through a line or a medium that has a propagation constant of "0." Because the resonator 1200 may have the zeroth order resonance characteristic, the resonance frequency may be independent with respect to a physical size of the MNG resonator 1200. By appropriately designing the capacitor 1220, the MNG resonator 1200 may sufficiently change the resonance frequency. Accordingly, the physical size of the MNG resonator 1200 may not be changed.

Referring to the MNG resonator 1200 of FIG. 12, in a near field, the electric field may be concentrated on the capacitor 1220 inserted into the transmission line. Accordingly, due to the capacitor 1220, the magnetic field may become dominant in the near field. For example, because the MNG resonator 1200 having the zeroth-order resonance characteristic may have characteristics similar to a magnetic dipole, the magnetic field may become dominant in the near field. A relatively small amount of the electric field formed due to the insertion of the capacitor 1220 may be concentrated on the capacitor 1220, and thus, the magnetic field may become further dominant.

Also, the MNG resonator 1200 may include the matcher 1230 for impedance matching. The matcher 1230 may adjust the strength of magnetic field of the MNG resonator 1200. An impedance of the MNG resonator 1200 may be determined by the matcher 1230. For example, current may flow into and/or out of the MNG resonator 1200 via a connector 1240. The connector 1240 may be connected to the ground conducting portion 1213 or the matcher 1230.

For example, as shown in FIG. 12, the matcher 1230 may be positioned within the loop formed by the loop structure of the resonator 1200. The matcher 1230 may adjust the impedance of the resonator 1200 by changing the physical shape of the matcher 1230. For example, the matcher 1230 may include the conductor 1231 for the impedance matching in a location that is separated from the ground conducting portion 1213 by a distance h. Accordingly, the impedance of the resonator 1200 may be changed by adjusting the distance h.

Although not illustrated in FIG. 12, a controller may be provided to control the matcher 1230. In this example, the matcher 1230 may change the physical shape of the matcher 1230 based on a control signal generated by the controller. For example, the distance h between the conductor 1231 of the matcher 1230 and the ground conducting portion 1213 may increase or decrease based on the control signal. Accordingly, the physical shape of the matcher 1230 may be changed and the impedance of the resonator 1200 may be adjusted.

The distance h between the conductor 1231 of the matcher 1230 and the ground conducting portion 1231 may be adjusted using a variety of schemes. For example, a plurality of conductors may be included in the matcher 1230 and the distance h may be adjusted by adaptively activating one of the conductors. As another example, the distance h may be adjusted by adjusting the physical location of the conductor 1231 up and down. The distance h may be controlled based on the control signal of the controller. For example, the controller may generate the control signal using various factors. An example of the controller generating the control signal is further described later.

As shown in FIG. 12, the matcher 1230 may be configured as a passive element such as the conductor 1231. As another example, the matcher 1230 may be configured as an active element such as a diode, a transistor, and the like. When the active element is included in the matcher 1230, the active element may be driven based on the control signal generated by the controller, and the impedance of the resonator 1200 may be adjusted based on the control signal. For example, a diode that is an active element may be included in the matcher 1230. The impedance of the resonator 1200 may be adjusted depending on whether the diode is in an ON state or in an OFF state.

Although not illustrated in FIG. 12, a magnetic core may pass through the resonator 1200 configured as the MNG resonator. The magnetic core may increase the power transmission distance.

Figure 13:
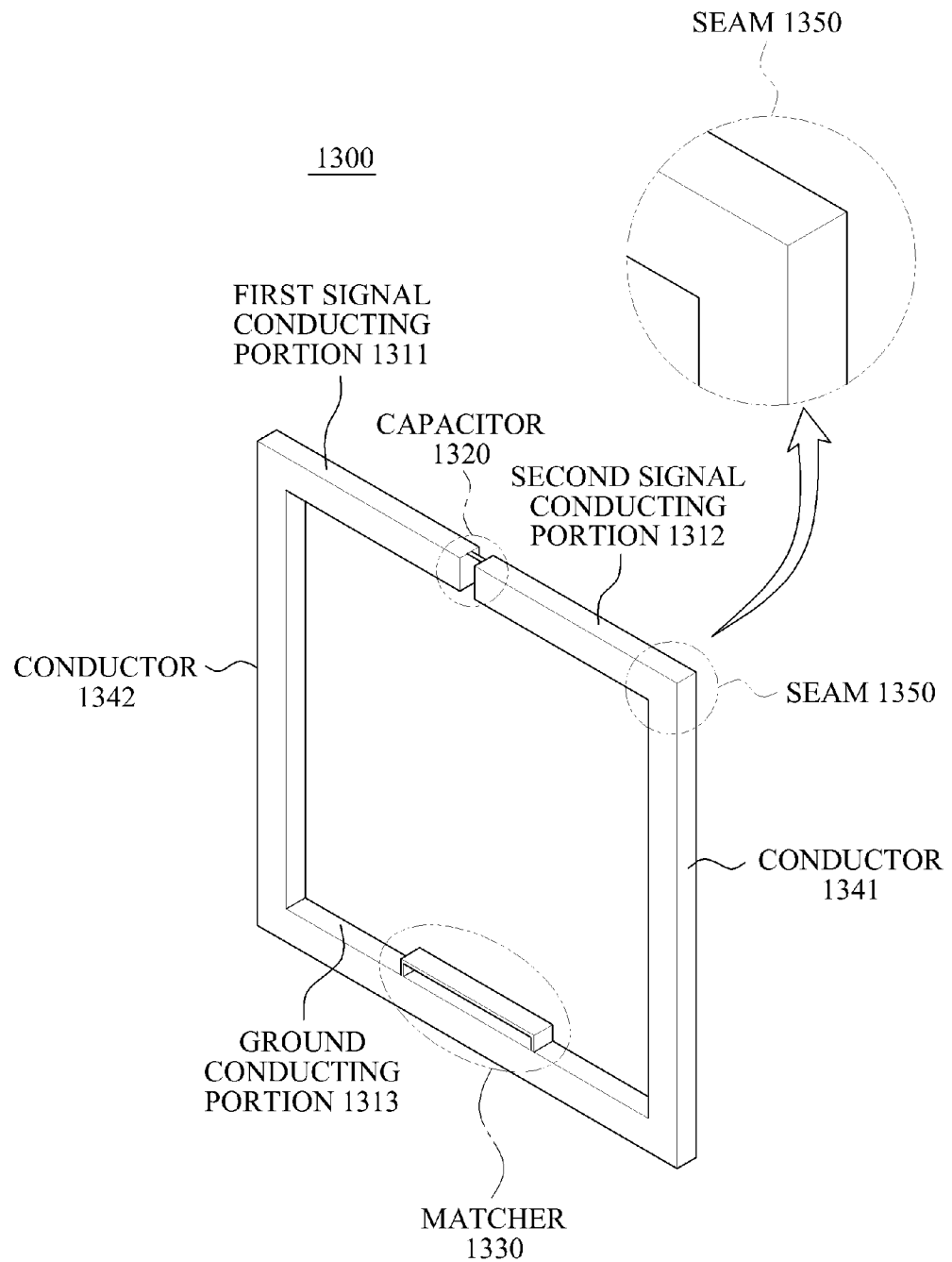

FIG. 13 illustrates an example of a bulky-type resonator for wireless power transmission.

Referring to FIG. 13, a first signal conducting portion 1311 and a second signal conducting portion 1312 may be integrally formed instead of being separately manufactured and later connected to each other. Similarly, the second signal conducting portion 1312 and the conductor 1341 may also be integrally manufactured.

When the second signal conducting portion 1312 and the conductor 1341 are separately manufactured and connected to each other, a loss of conduction may occur due to a seam 1350. The second signal conducting portion 1312 and the conductor 1341 may be connected to each other without using a separate seam such that they are seamlessly connected to each other. Accordingly, it is possible to decrease a conductor loss caused by the seam 1350. Accordingly, the second signal conducting portion 1312 and the ground conducting portion 1331 may be seamlessly and integrally manufactured. Similarly, the first signal conducting portion 1311 and the ground conducting portion 1331 may be seamlessly and integrally manufactured.

Referring to FIG. 13, a type of a seamless connection connecting at least two partitions into an integrated form is referred to as a bulky-type.

Figure 14:
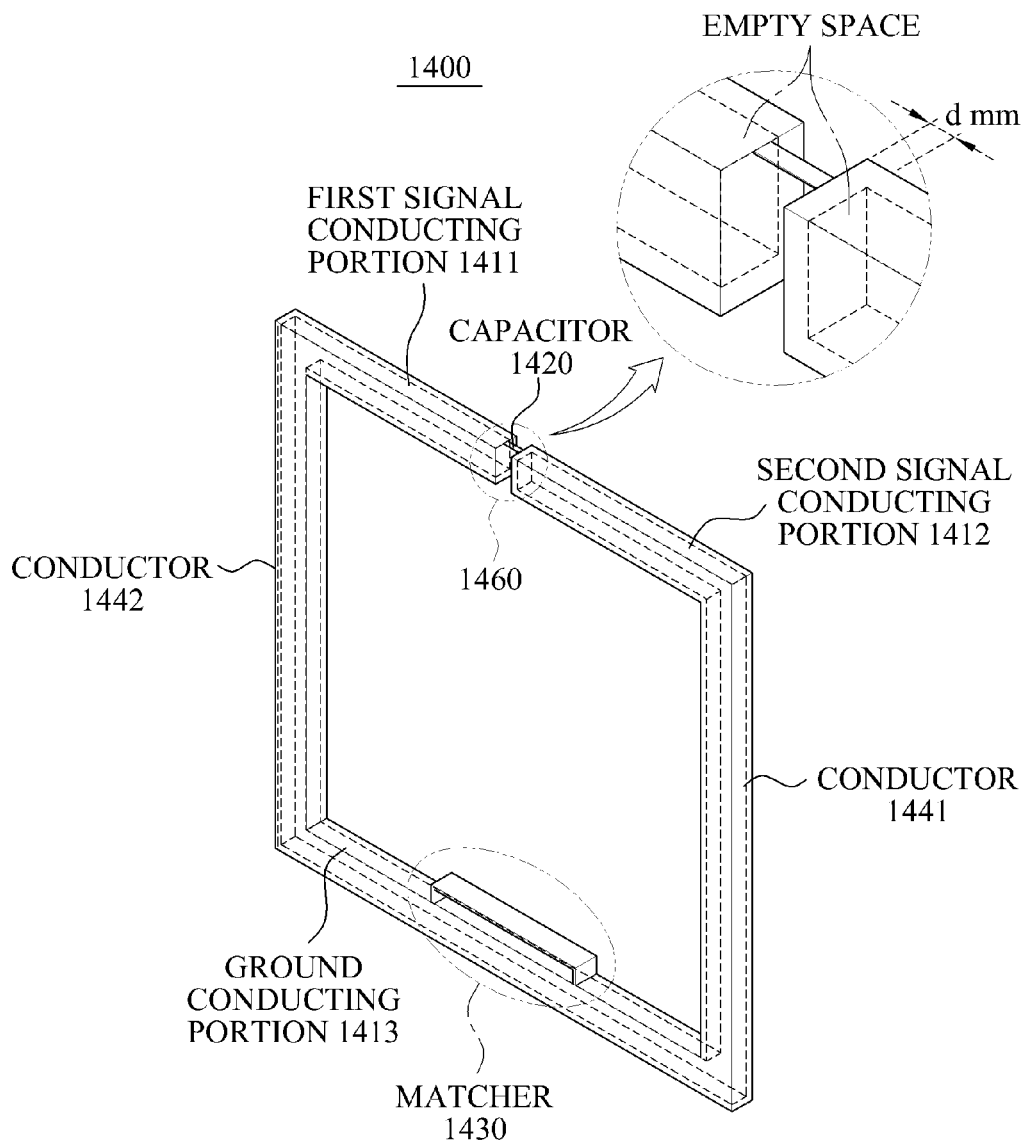

FIG. 14 illustrates an example of a hollow-type resonator for wireless power transmission.

Referring to FIG. 14, each of a first signal conducting portion 1411, a second signal conducting portion 1412, a ground conducting portion 1413, and conductors 1441 and 1442 of the resonator 1400 configured as the hollow-type include an empty space inside.

In a given resonance frequency, an active current may be modeled to flow in only a portion of the first signal conducting portion 1411 instead of the entire first signal conducting portion 1411, only a portion of the second signal conducting portion 1412 instead of the entire second signal conducting portion 1412, only a portion of the ground conducting portion 1413 instead of the entire ground conducting portion 1413, and/or only a portion of the conductors 1441 and 1442 instead of the entire conductors 1441 and 1442. For example, when a depth of each of the first signal conducting portion 1411, the second signal conducting portion 1412, the ground conducting portion 1413, and the conductors 1441 and 1442 is significantly deeper than a corresponding skin depth in the given resonance frequency, it may be ineffective. The significantly deeper depth may increase a weight or manufacturing costs of the resonator 1400.

Accordingly, in the given resonance frequency, the depth of each of the first signal conducting portion 1411, the second signal conducting portion 1412, the ground conducting portion 1413, and the conductors 1441 and 1442 may be appropriately determined based on the corresponding skin depth of each of the first signal conducting portion 1411, the second signal conducting portion 1412, the ground conducting portion 1413, and the conductors 1441 and 1442. When the first signal conducting portion 1411, the second signal conducting portion 1412, the ground conducting portion 1413, and the conductors 1441 and 1442 have an appropriate depth that is deeper than a corresponding skin depth, the resonator 1400 may become light, and manufacturing costs of the resonator 1400 may also decrease.

For example, as shown in FIG. 14, the depth of the second signal conducting portion 1412 may be determined as "d" mm and d may be determined according to $$d = \frac{1}{\sqrt{\pi f \mu \sigma}}.$$

In this example, f corresponds to a frequency, $\mu$ corresponds to a magnetic permeability, and $\sigma$ corresponds to a conductor constant.

For example, when the first signal conducting portion 1411, the second signal conducting portion 1412, the ground conducting portion 1413, and the conductors 1441 and 1442 are made of a copper and have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 15:
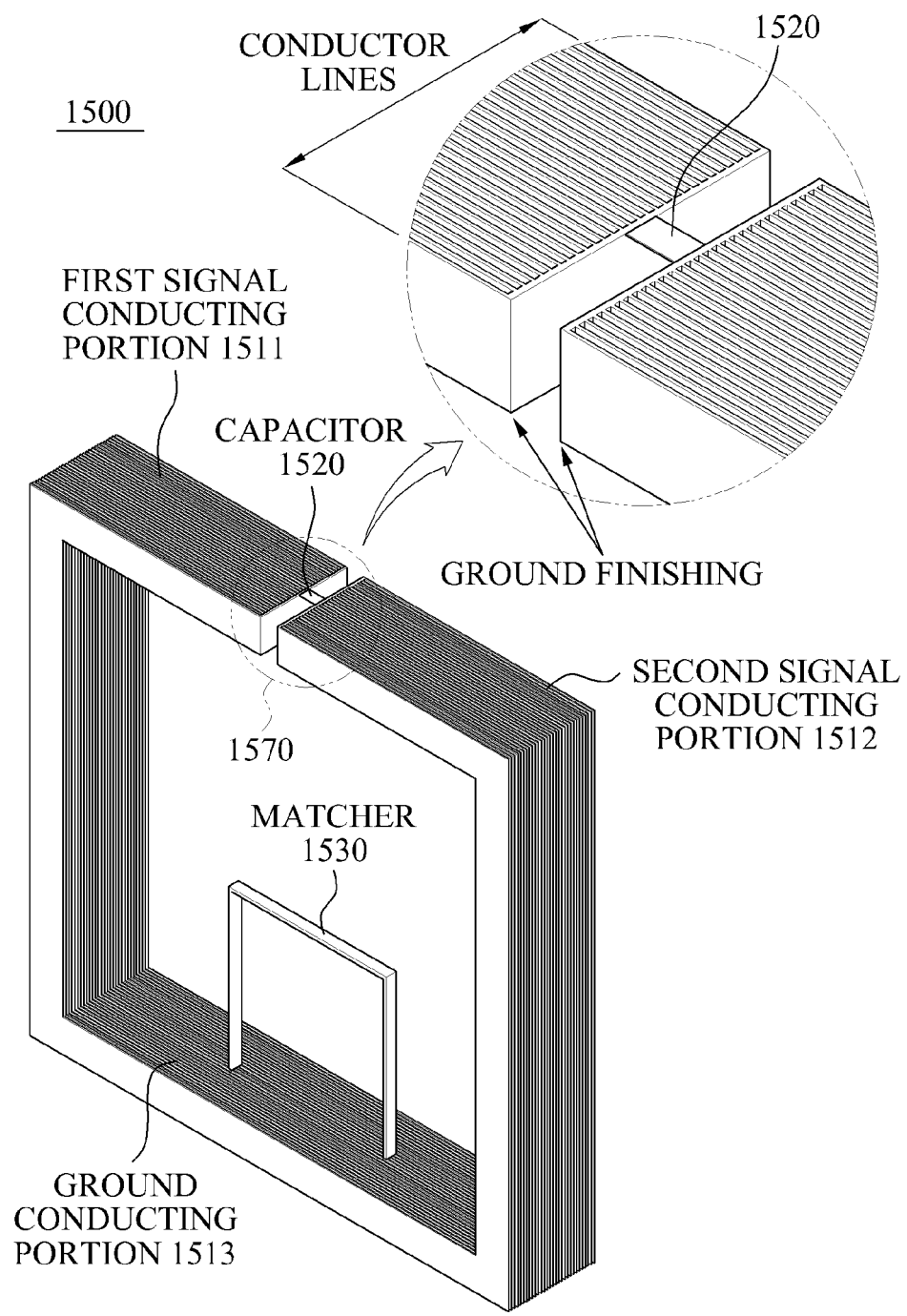

FIG. 15 illustrates an example of a resonator for wireless power transmission using a parallel-sheet.

Referring to FIG. 15, the parallel-sheet may be applicable to each of a first signal conducting portion 1511 and a second signal conducting portion 1512 included in the resonator 1500.

For example, the first signal conducting portion 1511 and the second signal conducting portion 1512 may not be a perfect conductor, and thus, may have a resistance. Due to the resistance, an ohmic loss may occur. The ohmic loss may decrease a Q-factor and may also decrease a coupling effect.

By applying the parallel-sheet to each of the first signal conducting portion 1511 and the second signal conducting portion 1512, it is possible to decrease the ohmic loss, and to increase the Q-factor and the coupling effect. For example, referring to a portion 1570 indicated by a circle, when the parallel-sheet is applied, each of the first signal conducting portion 1511 and the second signal conducting portion 1512 may include a plurality of conductor lines. For example, the plurality of conductor lines may be disposed in parallel, and may be shorted at an end portion of each of the first signal conducting portion 1511 and the second signal conducting portion 1512.

As described above, when the parallel-sheet is applied to each of the first signal conducting portion 1511 and the second signal conducting portion 1512, the plurality of conductor lines may be disposed in parallel. Accordingly, a sum of resistances having the conductor lines may decrease. As a result, the resistance loss may decrease, and the Q-factor and the coupling effect may increase.

Figure 16:
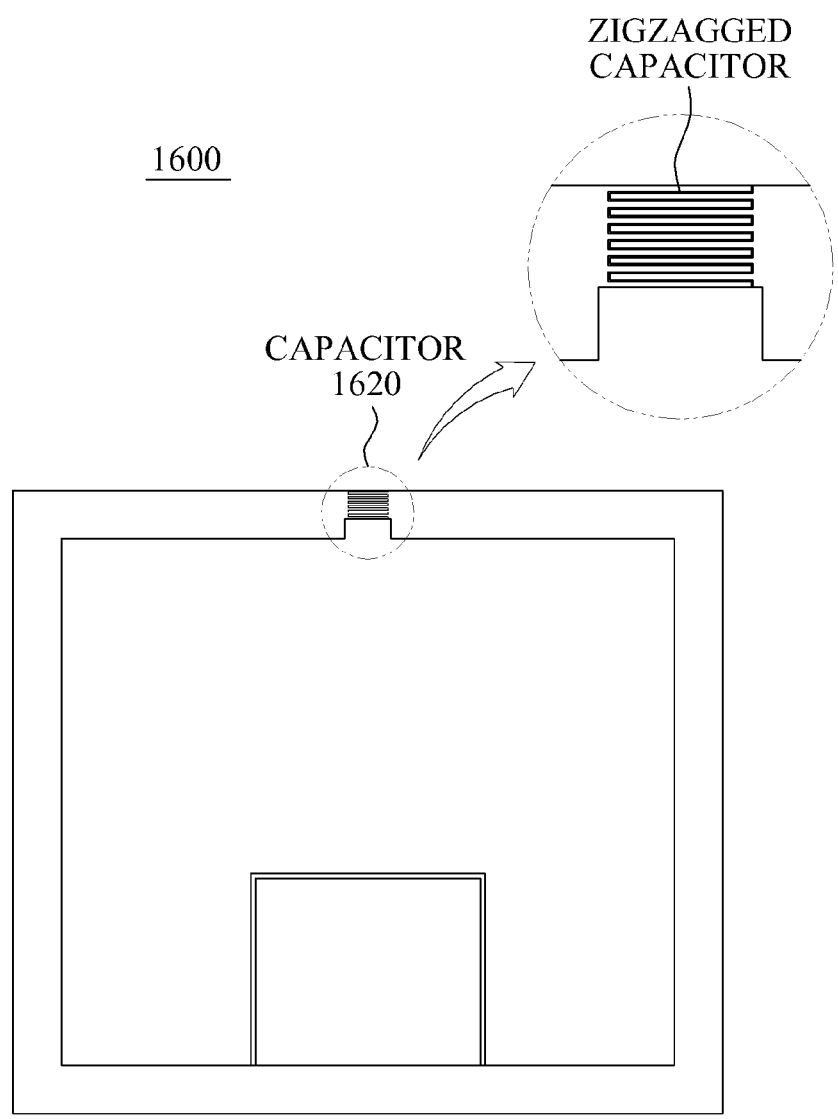

FIG. 16 illustrates an example of a resonator for wireless power transmission that includes a distributed capacitor.

Referring to FIG. 16, a capacitor 1620 included in the resonator 1600 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1620 as a distributed element, it is possible to decrease the ESR. A loss caused by the ESR may decrease a Q-factor and a coupling effect.

As shown in FIG. 16, the capacitor 1620 as the distributed element may have a zigzagged structure. For example, the capacitor 1620 as the distributed element may be configured as a conductive line and a conductor having the zigzagged structure.

As shown in FIG. 16, by employing the capacitor 1620 as the distributed element, it is possible to decrease the loss that occurs due to the ESR. In addition, by disposing a plurality of capacitors as lumped elements, it is possible to decrease the loss that occurs due to the ESR. Because a resistance of each of the capacitors as the lumped elements decreases through a parallel connection, active resistances of parallel-connected capacitors as the lumped elements may also decrease and the loss that occurs due to the ESR may decrease. For example, by employing ten capacitors of 1 pF instead of using a single capacitor of 10 pF, it is possible to decrease the loss occurring due to the ESR.

Figure 17A:
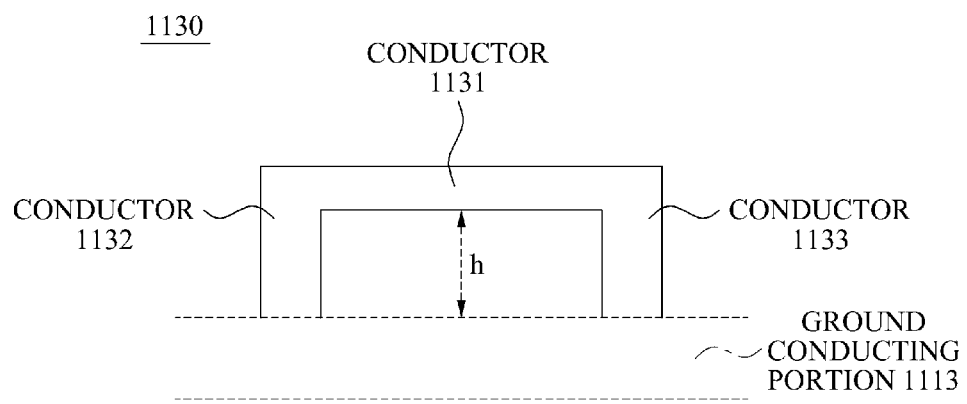
Figure 17B:
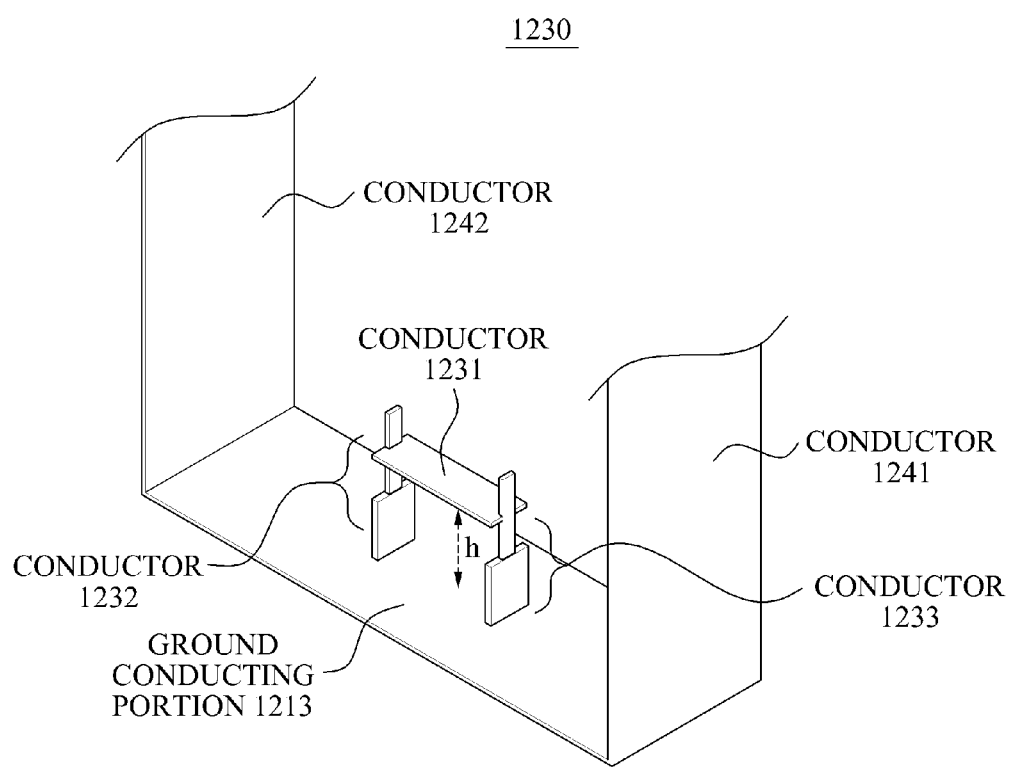

FIG. 17A illustrates an example of the matcher 1130 used in the resonator 1100 of FIG. 11, and FIG. 17B illustrates an example of the matcher 1230 used in the resonator 1200 of FIG. 12.

FIG. 17A illustrates a portion of the 2D resonator example including the matcher 1130, and FIG. 17B illustrates a portion of the 3D resonator example including the matcher 1230.

Referring to FIG. 17A, the matcher 1130 includes a conductor 1131, a conductor 1132, and a conductor 1133. The conductors 1132 and 1133 may be connected to the ground conducting portion 1113 and the conductor 1131. The impedance of the resonator may be determined based on a distance h between the conductor 1131 and the ground conducting portion 1113. For example, the distance h between the conductor 1131 and the ground conducting portion 1113 may be controlled by the controller. The distance h between the conductor 1131 and the ground conducting portion 1113 may be adjusted using a variety of schemes. For example, the variety of schemes may include a scheme of adjusting the distance h by adaptively activating one of the conductors 1131, 1132, and 1133, a scheme of adjusting the physical location of the conductor 1131 up and down, and the like.

Referring to FIG. 17B, the matcher 1230 includes a conductor 1231, a conductor 1232, and a conductor 1233. The conductors 1232 and 1233 may be connected to the ground conducting portion 1213 and the conductor 1231. The conductors 1232 and 1233 may be connected to the ground conducting portion 1213 and the conductor 1231. The impedance of the 3D resonator may be determined based on a distance h between the conductor 1231 and the ground conducting portion 1213. For example, the distance h between the conductor 1231 and the ground conducting portion 1213 may be controlled by the controller. Similar to the matcher 1130 included in the 2D resonator example, in the matcher 1230 included in the 3D resonator example, the distance h between the conductor 1231 and the ground conducting portion 1213 may be adjusted using a variety of schemes. For example, the variety of schemes may include a scheme of adjusting the distance h by adaptively activating one of the conductors 1231, 1232, and 1233, a scheme of adjusting the physical location of the conductor 1231 up and down, and the like.

Although not illustrated in FIGS. 17A and 17B, the matcher may include an active element. A scheme of adjusting an impedance of a resonator using the active element may be similar as described above. For example, the impedance of the resonator may be adjusted by changing a path of current flowing through the matcher using the active element.

Figure 18:
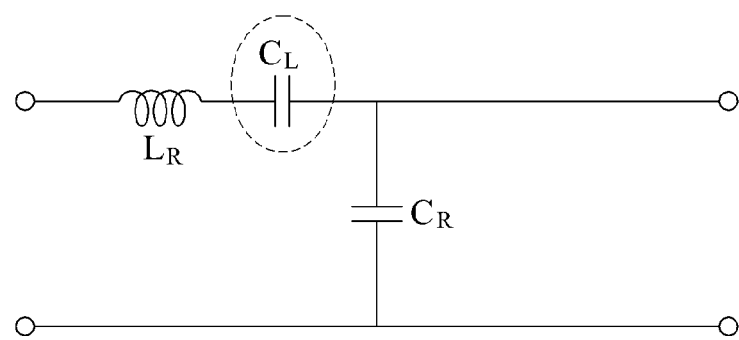
FIG. 18 is a diagram illustrating an example of an equivalent circuit of a resonator for wireless power transmission.

FIG. 18 illustrates an example of an equivalent circuit of the resonator 1100 for wireless power transmission of FIG. 11.

The resonator 1100 for the wireless power transmission may be modeled to the equivalent circuit of FIG. 18. In the equivalent circuit of FIG. 18, $C_L$ corresponds to a capacitor that is inserted in a form of a lumped element in the middle of the transmission line of FIG. 11.

In this example, the resonator 1100 may have a zeroth resonance characteristic. For example, when a propagation constant is "0", the resonator 1100 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR corresponds to a Mu zero resonator.

Referring to Equation 2, the resonance frequency $\omega_{MZR}$ of the resonator 1100 may be determined by $L_R/C_L$. A physical size of the resonator 1100 and the resonance frequency $\omega_{MZR}$ may be independent with respect to each other. Because the physical sizes are independent with respect to each other, the physical size of the resonator 1100 may be sufficiently reduced.

The processes, functions, methods, and/or software described above may be recorded, stored, or fixed, in one or more computer-readable storage media including program instructions to implement various operations embodied by a computer. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

According to various examples, a resonance point for wireless power transmission may be monitored. Therefore, when a source resonator and a target resonator are mismatched, a resonance point may be effectively tuned. A power loss due to a reflected wave between the source resonator and the target resonator may decrease.

As another example, when a coupling frequency is changed due to a mismatch between the source resonance and the target resonance, an impedance match may be performed by detecting a resonance point.

Described herein is a robot cleaning system that includes a robot cleaner and a power transmitter which supplies power wirelessly to the robot cleaner. For example, the robot cleaner may be supplied power wirelessly while the robot cleaner is performing a cleaning function. Accordingly, the efficiency of the robot cleaner is increased.

As described herein, the term battery is not intended to limit the specification thereto, and it should be understood that a battery may be interchangeably replaced with any power source or power supply that is capable of being charged.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A robot cleaning system, the system comprising:
    a wireless power transmitter configured to generate power using a provided power supply; and
    a robot cleaner configured to operate in a cleaning mode based on a scope of a predetermined area to be cleaned and a distance to the wireless power transmitter, receive and convert the wirelessly transmitted power into a rated voltage operable for the robot cleaner, and charge a battery using the rated voltage,
    wherein the robot is further configured to simultaneously receive the transmitted power and clean a cleaning area corresponding to a wireless charging area when the robot cleaner is located within the wireless charging area.

2. The system of claim 1, wherein the wireless power transmitter transmits the generated power based on at least one of an electromagnetic induction scheme, a radio wave reception scheme, and a resonance scheme.

3. The system of claim 1, wherein the wireless power transmitter wirelessly transmits the generated power by selecting one of an electromagnetic induction scheme, a radio wave reception scheme, and a resonance scheme, based on a distance to the robot cleaner.

4. The system of claim 3, wherein the wireless power transmitter uses a frequency band of 50 MHz through 2.6 GHz when the wireless power transmitter transmits the generated power based on the radio wave reception scheme, and uses a frequency band of 80 KHz through 15 MHz when the wireless power transmitter transmits the generated power based on the resonance scheme.

5. The system of claim 1, wherein the wireless power transmitter comprises:
    a wireless power transmitting unit configured to generate the power to be wirelessly transmitted, using a provided alternating current (AC); and
    a source resonator configured to transmit, to a target resonator, the generated power by energy-coupling with the target resonator of the robot cleaner.

6. The system of claim 1, wherein the robot cleaner comprises:
    a target resonator configured to receive the wirelessly transmitted power by energy-coupling with a source resonator;
    a wireless power receiving unit configured to convert the received power into the rated voltage; and a battery controller configured to check the remaining capacity of the battery based on the scope of the predetermined area to be cleaned, and charge the battery using the rated voltage.

7. The system of claim 6, wherein the wireless power receiving unit comprises:
an AC/DC converter configured to convert the power that is an alternating signal into a direct signal; and
a DC converter configured to adjust a level of the direct signal that is converted by the AC/DC converter, and to output the rated voltage.

8. The system of claim 6, wherein the battery controller controls the robot cleaner to charge the battery when the remaining capacity of the battery is less than a predetermined capacity set based on the scope of the predetermined area to be cleaned.

9. The system of claim 6, wherein the battery controller detects a location of the wireless power transmitter and moves the robot cleaner towards the wireless power transmitter to charge the battery, when the battery is to be charged and wireless charging is not available in the detected location.

10. A wirelessly charged robot cleaner, the robot cleaner comprising:
a target resonator configured to receive a resonance power through energy-coupling with a source resonator of a wireless power transmitter;
a wireless power receiving unit configured to convert the received resonance power into a rated voltage operable for the robot cleaner; a battery controller configured to check a remaining capacity of the battery based on a scope of a predetermined area to be cleaned, and charge the battery using the rated voltage; and
a communicating unit configured to wirelessly transmit information to the wireless power transmitter,
wherein the robot cleaner simultaneously receives the resonance power and cleans a cleaning area corresponding to a wireless charger area when the robot cleaner is located within the wireless charging area.

11. The robot cleaner of claim 10, wherein the wireless power receiving unit comprises:
an AC/DC converter configured to convert the resonance power that is an alternating signal into a direct signal; and
a DC converter configured to adjust a level of the direct signal that is converted from the AC/DC converter, and output the rated voltage.

12. The robot cleaner of claim 10, wherein the battery controller controls the robot cleaner to charge the battery when the remaining capacity of the battery is less than a predetermined capacity set based on the scope of the predetermined area to be cleaned.

13. The robot cleaner of claim 10, wherein the battery controller detects a location of the wireless power transmitter and moves the robot cleaner towards the wireless power transmitter to charge the battery, when the battery is to be charged and wireless charging is not available in the detected location.

14. The robot cleaner of claim 10, further comprising:
a cleaner controller configured to control the robot cleaner to operate in a cleaning mode to perform a predetermined cleaning operation when a cleaning event is sensed, wherein
the robot cleaner operates in the cleaning mode while the target resonator of the robot cleaner simultaneously receives the resonance power through energy-coupling with the source resonator of the wireless power transmitter.

15. The robot cleaner of claim 14, wherein the battery controller controls the robot cleaner to move towards the wireless power transmitter to charge the battery when the remaining capacity of the battery is less than a predetermined capacity while the robot cleaner is operating in the cleaning mode.

16. A method of controlling a wirelessly charged robot cleaner, the method comprising:
wirelessly transmitting, to a wireless power transmitter, information about an amount of power to be charged and a location of the robot cleaner,
receiving a resonance power through energy-coupling with a source resonator of a wireless power transmitter;
converting the received resonance power into a rated voltage operable for the robot cleaner; and
charging a battery using the rated voltage,
wherein the method further comprises simultaneously receiving the resonance power and cleaning a cleaning area corresponding to a wireless charging area when the robot cleaning is located within the wireless charging area.

17. The method of claim 16, wherein the converting comprises:
converting the resonance power that is an alternating signal into a direct signal;
adjusting a level of the direct signal; and
outputting the rated voltage.

18. The method of claim 16, further comprising:
detecting a location of the wireless power transmitter and moving towards the wireless power transmitter, when the battery is to be charged and wireless charging is not available in the detected location,
wherein the detecting and the moving is performed before receiving the resonance power.

19. The method of claim 16, further comprising:
controlling the robot cleaner to operate in a cleaning mode to perform a predetermined cleaning operation when a cleaning event is sensed,
wherein the robot cleaner operates in the cleaning mode while the target resonator of the robot cleaner simultaneously receives the resonance power through energy-coupling with the source resonator of the wireless power transmitter.

20. The method of claim 19, further comprising:
moving towards the wireless power transmitter to charge the battery when the remaining capacity of the battery is less than the predetermined capacity while the robot cleaner is operating in the cleaning mode.

21. A wireless power transmitter for transmitting power wirelessly to a robot cleaner, the wireless power transmitter comprising:
a wireless power transmitting unit configured to generate power to be wirelessly transmitted to a robot cleaner;
a communicating unit configured to wirelessly receive information from the robot cleaner about an amount of power to be charged and a location of the robot cleaner, the amount of power being determined based on a scope of a predetermined area to be cleaned; and
a source resonator configured to wirelessly transmit the generated power to the robot cleaner based on the received information,
wherein the robot cleaner simultaneously receives the transmitted power and cleans a cleaning area corresponding to a wireless charging area when the robot cleaner is located within the wireless charging area.

22. The wireless power transmitter of claim 21, further comprising a controller configured to determine whether to charge the robot cleaner, based on the amount of distance between the robot cleaner and the wireless power transmitter.

23. The wireless power transmitter of claim 21, wherein the source resonator is configured to wirelessly transmit power to the robot cleaner using an electromagnetic induction scheme, a radio wave reception scheme, and a resonance scheme, and
 the controller selects which scheme to transmit power to the robot cleaner based on the distance between the robot cleaner and the wireless power transmitter.

24. The wireless power transmitter of claim 21, wherein, in response to receiving a request for charging from the robot cleaner, the communicating unit provides the information about the location of the wireless power transmitter to the robot cleaner.

25. The system of claim 1, wherein the robot cleaner is further configured to charge the battery while cleaning the scope of the predetermined area.

\* \* \* \* \*